US010122768B2

(12) United States Patent
Umehara

(10) Patent No.: US 10,122,768 B2
(45) Date of Patent: Nov. 6, 2018

(54) CONTROL SYSTEM, COMMUNICATION SYSTEM, COMPUTER PROGRAM, CONTROLLING METHOD, AND COMPUTER PROGRAM PRODUCT

(71) Applicant: Naoki Umehara, Kanagawa (JP)

(72) Inventor: Naoki Umehara, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 180 days.

(21) Appl. No.: 15/036,859

(22) PCT Filed: Nov. 18, 2014

(86) PCT No.: PCT/JP2014/080991
§ 371 (c)(1),
(2) Date: May 16, 2016

(87) PCT Pub. No.: WO2015/072582
PCT Pub. Date: May 21, 2015

(65) Prior Publication Data
US 2016/0330250 A1 Nov. 10, 2016

(30) Foreign Application Priority Data
Nov. 18, 2013 (JP) .................. 2013-237632

(51) Int. Cl.
H04L 29/06 (2006.01)
H04L 29/08 (2006.01)
(Continued)

(52) U.S. Cl.
CPC ........ H04L 65/1066 (2013.01); G06F 13/385 (2013.01); H04L 65/1093 (2013.01); H04N 7/152 (2013.01); H04M 3/56 (2013.01)

(58) Field of Classification Search
CPC . H04L 65/1093; H04L 65/1066; H04L 67/14; H04L 43/0811; G06F 13/385; H04M 3/56; H04N 7/152
(Continued)

(56) References Cited

U.S. PATENT DOCUMENTS

2004/0024909 A1* 2/2004 Yumoto ................ G06F 3/0605
709/248
2004/0139225 A1 7/2004 Takahashi
(Continued)

FOREIGN PATENT DOCUMENTS

CN 1578317 A 2/2005
CN 101868940 A 10/2010
(Continued)

OTHER PUBLICATIONS

International Search Report dated Feb. 17, 2015 in PCT/JP2014/080991 filed on Nov. 18, 2014.
(Continued)

Primary Examiner — Ruolei Zong
(74) Attorney, Agent, or Firm — Oblon, McClelland, Maier & Neustadt, L.L.P.

(57) ABSTRACT

A control system includes controllers controlling a session between communication terminals. Each controller includes a state management unit, first and second updating units, and a receiver. The state management unit manages state information of each terminal indicating a state of connection between the terminal and the controller. When the state of connection between a first terminal and the controller is changed, the first updating unit updates state information of the first terminal. When the state of connection between a second terminal and another controller is changed, the receiver receives, from the other controller, changed state information of the second terminal indicating a state of
(Continued)

connection between the second terminal and the other controller after being changed. The second updating unit updates the state information of the second terminal based on the received changed state information. The controller controls the session between the terminals based on the state information.

14 Claims, 27 Drawing Sheets

(51) Int. Cl.
  *G06F 13/38* (2006.01)
  *H04N 7/15* (2006.01)
  *H04M 3/56* (2006.01)
(58) Field of Classification Search
  USPC .......................................................... 709/227
  See application file for complete search history.

(56) References Cited

U.S. PATENT DOCUMENTS

| | | | |
|---|---|---|---|
| 2004/0267939 A1* | 12/2004 | Yumoto | H04L 29/06 709/227 |
| 2005/0216668 A1* | 9/2005 | Kobayashi | G06F 9/4416 711/118 |
| 2007/0071202 A1* | 3/2007 | Sasaki | H04L 61/106 379/158 |
| 2008/0123633 A1* | 5/2008 | Shima | H04L 12/66 370/352 |
| 2008/0155689 A1 | 6/2008 | Denninghoff | |
| 2010/0263047 A1 | 10/2010 | Denninghoff et al. | |
| 2010/0325430 A1 | 12/2010 | Denninghoff | |
| 2012/0314019 A1 | 12/2012 | Asai | |
| 2013/0117373 A1 | 5/2013 | Umehara | |
| 2013/0242038 A1 | 9/2013 | Umehara et al. | |
| 2014/0078245 A1 | 3/2014 | Umehara et al. | |
| 2014/0129641 A1 | 5/2014 | Umehara | |
| 2014/0365606 A1 | 12/2014 | Shimakawa | |
| 2015/0077505 A1 | 3/2015 | Umehara | |
| 2015/0092012 A1 | 4/2015 | Umehara | |
| 2015/0130890 A1 | 5/2015 | Umehara | |
| 2015/0138306 A1 | 5/2015 | Umehara | |
| 2015/0256993 A1 | 9/2015 | Umehara | |

FOREIGN PATENT DOCUMENTS

| | | |
|---|---|---|
| CN | 102791044 A | 11/2012 |
| JP | 2004-5092 A | 1/2004 |
| JP | 2007-519302 A | 7/2007 |
| JP | 2008-071156 | 3/2008 |
| JP | 2011-35833 A | 2/2011 |
| JP | 2011-199845 | 10/2011 |
| JP | 2012-050063 | 3/2012 |
| JP | 2013-243469 | 12/2013 |
| JP | 2013-243470 | 12/2013 |
| JP | 2013-243471 | 12/2013 |
| JP | 2013-243472 | 12/2013 |
| JP | 2014-017825 | 1/2014 |
| JP | 2015-092651 | 5/2015 |
| WO | 2005/036802 A2 | 4/2005 |
| WO | 2013/121487 A1 | 8/2013 |

OTHER PUBLICATIONS

Office Action dated Sep. 5, 2017 in Japanese Patent Application No. 2013-237632.
Combined Chinese Office Action and Search Report dated Feb. 23, 2018 in Chinese Patent Application No. 201480062869.7 (with English translation), 23 pages.

* cited by examiner

FIG.8A

RELAYING APPARATUS MANAGEMENT TABLE

| RELAYING APPARATUS ID | PASSWORD |
|---|---|
| 111a@jp.oo.com | xxxx |
| 111b@jp.oo.com | yyyy |

FIG.8B

RELAYING APPARATUS MANAGEMENT TABLE

| RELAYING APPARATUS ID | PASSWORD |
|---|---|
| 111c@us.oo.com | xyxy |
| 111d@us.oo.com | zyzy |

FIG.9A

TERMINAL AUTHENTICATION MANAGEMENT TABLE

| TERMINAL ID/DOMAIN INFORMATION | PASSWORD |
|---|---|
| 01aa@jp1.oo.com | aaaa |
| 01ab@jp1.oo.com | abab |
| 01ba@jp1.oo.com | baba |
| ... | ... |

FIG.9B

TERMINAL AUTHENTICATION MANAGEMENT TABLE

| TERMINAL ID/DOMAIN INFORMATION | PASSWORD |
|---|---|
| 01ca@us1.oo.com | cccc |
| 01cb@us1.oo.com | cdcd |
| 01da@us2.oo.com | dcdc |
| ... | ... |

FIG.10

STATE MANAGEMENT TABLE

| TERMINAL ID | STATE INFORMATION |
|---|---|
| 01aa@jp1.oo.com | None |
| 01ab@jp1.oo.com | Busy |
| ... | ... |
| 01ba@jp2.oo.com | Calling |
| 01bb@jp2.oo.com | Ringing |
| ... | ... |

FIG.11A

DESTINATION LIST MANAGEMENT TABLE

| TERMINAL ID | |
|---|---|
| REQUEST SOURCE | DESTINATION |
| 01aa@jp.oo.com | 01ab@jp1.oo.com<br>01bb@jp2.oo.com<br>01bd@jp2.oo.com<br>01cb@us1.oo.com<br>01db@us2.oo.com |
| 01ab@jp.oo.com | 01aa@jp1.oo.com<br>01ca@us1.oo.com<br>01cb@us1.oo.com<br>01cc@us1.oo.com |
| ... | ... |

FIG.11B

DESTINATION LIST MANAGEMENT TABLE

| TERMINAL ID | |
|---|---|
| REQUEST SOURCE | DESTINATION |
| 01ca@us.oo.com | 01aa@jp1.oo.com<br>01ba@jp2.oo.com<br>01cb@us1.oo.com<br>01db@us2.oo.com |
| 01cb@us.oo.com | 01aa@jp1.oo.com<br>01ca@us1.oo.com<br>01cc@us1.oo.com |
| ... | ... |

FIG.12A

SESSION MANAGEMENT TABLE

| SESSION ID | RELAYING APPARATUS ID | TERMINAL ID |
|---|---|---|
| se01@jp.oo.com | 111a@jp.oo.com | 01aa@jp1.oo.com, 01bd@jp2.oo.com |
| se02@jp.oo.com | 111b@jp.oo.com | 01ad@jp1.oo.com |
| ... | ... | ... |

FIG.12B

SESSION MANAGEMENT TABLE

| SESSION ID | RELAYING APPARATUS ID | TERMINAL ID |
|---|---|---|
| se51@us.oo.com | 111c@us.oo.com | 01da@us2.oo.com, 01cc@us1.oo.com |
| se52@us.oo.com | 111b@us.oo.com | 01de@us2.oo.com |
| ... | ... | ... |

FIG.13A

STATE CHANGE MANAGEMENT TABLE (Call, Join, Leave)

| MANAGEMENT INFORMATION | PRE-CHANGE STATE INFORMATION | POST-CHANGE STATE INFORMATION |
|---|---|---|
| Call | None | Accepted |
| Join | Accepted | Busy |
| Leave | Busy | None |

FIG.13B

STATE CHANGE MANAGEMENT TABLE (Invite, Accept)

| MANAGEMENT INFORMATION | TERMINAL INFORMATION | PRE-CHANGE STATE INFORMATION | POST-CHANGE STATE INFORMATION |
|---|---|---|---|
| Invite | TRANSMISSION SOURCE | None | Inviting |
| | TRANSMISSION DESTINATION | None | Invited |
| Ring | TRANSMISSION DESTINATION | Inviting | Calling |
| | TRANSMISSION SOURCE | Invited | Ringing |
| Accept | TRANSMISSION DESTINATION | Calling | Accepted |
| | | Accepted | Accepted |
| | TRANSMISSION SOURCE | Ringing | Accepted |

FIG.14

RELAYING APPARATUS SELECTION MANAGEMENT TABLE

| RELAYING APPARATUS ID | TERMINAL ID | PRIORITY |
|---|---|---|
| 111a@jp.oo.com | 01aa@jp1.oo.com | 3 |
| | ... | ... |
| | 01bd@jp2.oo.com | 2 |
| | ... | ... |
| 111b@jp.oo.com | 01aa@jp1.oo.com | 1 |
| | ... | ... |
| | 01bd@jp2.oo.com | 2 |
| | ... | ... |
| 111c@us.oo.com | 01aa@jp1.oo.com | 1 |
| | ... | ... |
| | 01bd@jp2.oo.com | 1 |
| | ... | ... |
| 111d@us.oo.com | 01aa@jp1.oo.com | 1 |
| | ... | ... |
| | 01bd@jp2.oo.com | 1 |
| | ... | ... |

FIG.15

TERMINAL MANAGEMENT TABLE

| TERMINAL ID | DESTINATION NAME | OPERATION STATE |
|---|---|---|
| 01aa@jp1.oo.com | TOKYO OFFICE AA TERMINAL | OFFLINE |
| 01ab@jp1.oo.com | TOKYO OFFICE AB TERMINAL | ONLINE (IN CONFERENCE) |
| ... | ... | ... |
| 01ba@jp2.oo.com | OSAKA OFFICE BA TERMINAL | ONLINE |
| 01bb@jp2.oo.com | OSAKA OFFICE BB TERMINAL | ONLINE |
| ... | ... | ... |

US 10,122,768 B2

CONTROL SYSTEM, COMMUNICATION SYSTEM, COMPUTER PROGRAM, CONTROLLING METHOD, AND COMPUTER PROGRAM PRODUCT

TECHNICAL FIELD

The present invention relates to a control system, a communication system, a computer program, a controlling method, and a computer program product.

BACKGROUND ART

Recently, communication systems performing communication via communication networks such as the Internet and exclusive lines have become widespread along with requests for reductions in business trip expenses and business trip times. Such a communication system establishes a session for transmitting and receiving content data such as image data and voice data between communication terminals, thereby achieving communication between the communication terminals.

It is known that a teleconference system as an example of the communication system causes a teleconference management system to control a session between teleconference terminals (refer to Patent Literature 1). The teleconference system is configured so that a communication start request or its response is transmitted and received between the teleconference terminals via the teleconference management system. The teleconference management system manages whether each of the teleconference terminals is connected to the management system (online) or not (offline) and determines that, when a teleconference terminal selected as a destination of communication is not connected to the management system, the teleconference terminal is not in a communicable state. This configuration enables the teleconference management system to reject a communication start request without transmitting the communication start request to the teleconference terminal as the destination, thereby reducing the time required for processing.

In conventional teleconference systems, a plurality of teleconference terminals is connected to one teleconference management system. Owing to this configuration, when the number of the teleconference terminals connected to the teleconference management system increases, a large processing load is imposed on the teleconference management system. A method is developed that distributes a load imposed on a server by providing a plurality of servers performing processing as a technique for reducing the load imposed on one server (refer to Patent Literature 2).

However, when a plurality of controllers are provided in order to control a session between communication terminals, each of the controllers becomes incapable of determining whether, when a communication terminal selected as a destination of communication is not connected to the controller, the communication terminal as the destination is in a communicable state based on the state of connection between the communication terminal and the controller. This causes a problem in that the session between the communication terminals cannot be efficiently controlled.

SUMMARY OF THE INVENTION

A control system includes a plurality of controllers that control a session between communication terminals. Each of the controllers includes a state management unit, a first updating unit, a changed state information receiver, and a second updating unit. The state management unit manages state information of each communication terminal, which indicates a state of connection between the communication terminal and the controller. When the state of connection between a first communication terminal and the controller is changed, the first updating unit updates state information of the first communication terminal managed by the state management unit. When the state of connection between a second communication terminal and another controller is changed, the changed state information receiver receives, from the other controller, changed state information of the second communication terminal, which indicates a state of connection between the second communication terminal and the other controller after being changed. The second updating unit updates the state information of the second communication terminal managed by the state management unit based on the changed state information received by the changed state information receiver. The controller controls the session between the communication terminals based on the state information managed by the state management unit.

BRIEF DESCRIPTION OF DRAWINGS

FIGS. 8A and 8B are conceptual diagrams illustrating relaying apparatus management tables.

FIGS. 9A and 9B are conceptual diagrams illustrating terminal authentication management tables.

FIG. 10 is a conceptual diagram illustrating state management tables.

FIGS. 11A and 11B are conceptual diagrams illustrating destination list management tables.

FIGS. 12A and 12B are conceptual diagrams illustrating session management tables.

FIGS. 13A and 13B are conceptual diagrams illustrating state change management tables.

FIG. 14 is a conceptual diagram illustrating a relaying apparatus selection management table.

FIG. 15 is a conceptual diagram illustrating terminal management tables.

DESCRIPTION OF EMBODIMENTS

Overall Structure of Embodiment

Figure 1:
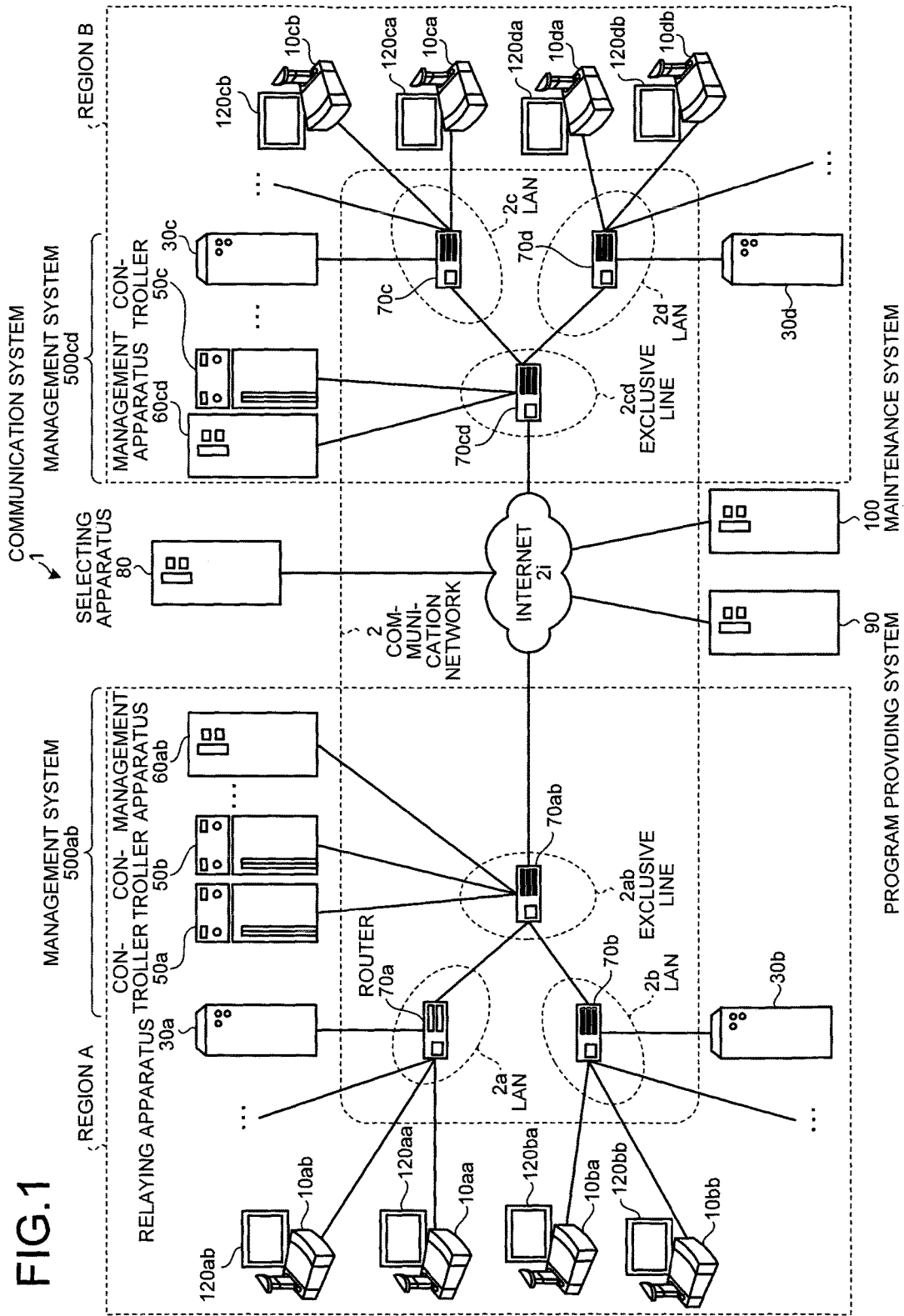
FIG. 1 is a schematic diagram of a communication system according to an embodiment of the present invention.
Figure 2:
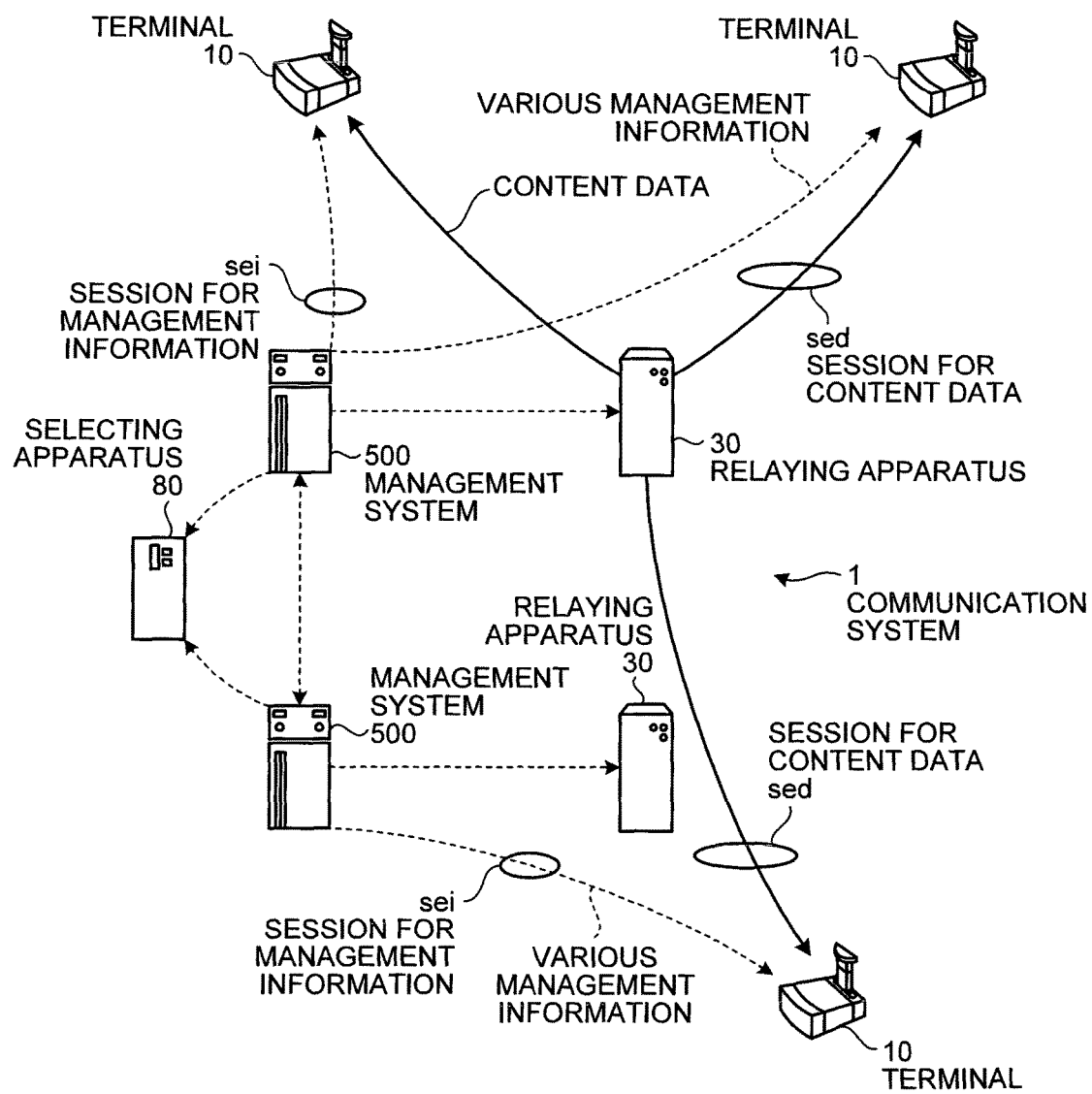
FIG. 2 is a conceptual diagram illustrating the state of the transmission and reception of image data, voice data, and various types of management information in the communication system.

An embodiment according to the present invention will be described below. First, the overall structure of the embodiment will be described with reference to FIG. 1 and FIG. 2. FIG. 1 is a schematic diagram of a communication system according to the embodiment of the present invention. FIG. 2 is a conceptual diagram illustrating the state of the transmission and reception of image data, voice data, and various types of management information in the communication system.

The communication system according to the present embodiment includes a data providing system that communicates content data unidirectionally from one communication terminal to another communication terminal and a communication system that transmits information mutually among a plurality of communication terminals. This communication system is a system for transmitting information mutually among a plurality of communication terminals (corresponding to "communication terminals") via a communication management system (corresponding to a "communication management system"), and examples thereof may include teleconference systems, videophone systems, voice conference systems, voice phone systems, personal computer (PC) screen sharing systems, and data sharing systems.

The present embodiment describes a communication system, a communication management system, and a communication terminal assuming a teleconference system as an example of the communication system, a teleconference management system as an example of the communication management system, and a teleconference terminal as an example of the communication terminal. In other words, the communication terminal and the communication management system according to the present embodiment are not only used in the teleconference system, but also used in the communication system or the communication system.

This communication system 1 illustrated in FIG. 1 includes a plurality of communication terminals (10*aa*, 10*ab*, . . . ), displays (120*aa*, 120*ab*, . . . ) for the respective communication terminals (10*aa*, 10*ab*, . . . ), a plurality of relaying apparatuses (30*a*, 30*b*, 30*c*, 30*d*), a plurality of communication management systems (500*ab*, 500*cd*), a relaying apparatus selecting apparatus 80, a program providing system 90, and a maintenance system 100. The communication terminals 10 perform communication through the transmission and reception of image data and voice data as examples of content data. The content data is not limited to the image data and the voice data and may be at least one of image data, voice data, and text data, for example. The image of the image data may be a moving image and a still image and may be both a moving image and a still image. The present embodiment describes a case in which the image of the image data is a moving image.

In the following, the "communication terminal" will be simply denoted as a "terminal," the "communication management system" will be simply denoted as a "management system," and the "relaying apparatus selecting apparatus" will be simply denoted as a "selecting apparatus." Among the communication management systems (500*ab*, 500*cd*), any management system will be denoted as a "management system 500." Among the terminals (10*aa*, 10*ab*, . . . ), any terminal will be denoted as a "terminal 10." Among the displays (120*aa*, 120*ab*, . . . ), any display will be denoted as a "display 120." Among the relaying apparatuses (30*a*, 30*b*, 30*c*, 30*d*), any relaying apparatus will be denoted as a "relaying apparatus 30."

As illustrated in FIG. 2, in the communication system 1, a session sei for management information is established for transmitting and receiving various types of management information between the terminals 10 via the management system 500. A session is established for transmitting and receiving image data and voice data between the terminals 10 via the relaying apparatus 30. In this example, the session for transmitting and receiving the image data and the voice data is collectively illustrated as a session sed for content data.

The terminal 10 illustrated in FIG. 1 performs the transmission and reception of content data such as image data and voice data in order to perform communication with the other terminal 10. In other words, the communication in the present embodiment includes not only the transmission and reception of the voice data, but also the transmission and reception of the image data. The terminal 10 may perform the transmission and reception of the voice data without performing the transmission and reception of the image data. The relaying apparatus 30 selected out of the relaying apparatuses 30 by the selecting apparatus 80 relays content data among the terminals 10. The management system 500 may be constructed by a plurality of computers. In the communication system 1 illustrated in FIG. 1, a plurality of controllers (50*a*, 50*b*, . . . ) and a management apparatus 60*ab* construct the communication management system 500*ab*. In the following, among the controllers (50*a*, 50*b*, . . . ), any controller will be denoted as a "controller 50."

A plurality of routers (70*a*, 70*b*, 70*c*, 70*d*, 70*ab*, 70*cd*) select an optimum path of content data. In the following, among the routers (70*a*, 70*b*, 70*c*, 70*d*, 70*ab*, 70*cd*), any router will be denoted as a "router 70."

The program providing system 90 includes a hard disk (HD) 204 described below, which stores therein a program for terminals to cause the terminal 10 to implement various functions (or to cause the terminal 10 to function as various units) and can transmit the program for terminals to the terminal 10. The HD 204 of the program providing system 90 also stores therein a program for relaying apparatuses to cause the relaying apparatus 30 to implement various functions (or to cause the relaying apparatus 30 to function as various units) and can transmit the program for relaying apparatuses to the relaying apparatus 30. The HD 204 of the program providing system 90 also stores therein a program for a selecting apparatus to cause the selecting apparatus 80 to implement various functions (or to cause the selecting apparatus 80 to function as various units) and can transmit the program for a selecting apparatus to the selecting apparatus 80. The HD 204 of the program providing system 90 also stores therein a program for a maintenance system to cause the maintenance system 100 to implement various functions (or to cause the maintenance system 100 to function as various units) and can transmit the program for a maintenance system to the maintenance system 100.

The maintenance system 100 is a computer for keeping, managing, or maintaining at least one of the terminal 10, the relaying apparatus 30, the management system 500, the selecting apparatus 80, and the program providing system 90. When the maintenance system 100 is domestically installed, and the terminal 10, the relaying apparatus 30, the management system 500, the selecting apparatus 80, and the program providing system 90 are installed abroad, for example, the maintenance system 100 keeps, manages, or maintains at least one of the terminal 10, the relaying apparatus 30, the management system 500, the selecting apparatus 80, and the program providing system 90 remotely via a communication network 2. The maintenance system 100 performs maintenance such as the management of the model number, serial number, customer, maintenance and inspection, trouble history or the like of at least one of the terminal 10, the relaying apparatus 30, the management system 500, the selecting apparatus 80, and the program providing system 90 without the involvement of the communication network 2.

The terminals (10aa, 10ab, . . . ), the relaying apparatus 30a, and the router 70a are communicably connected via a LAN 2a. The terminals (10ba, 10ab, . . . ), the relaying apparatus 30b, and the router 70b are communicably connected via a LAN 2b. The management system 500ab, the LAN 2a, and the LAN 2b are communicably connected via an exclusive line tab including the router 70ab and are constructed in a given region A. The region A is Japan, the LAN 2a is constructed in a Tokyo office, and the LAN 2b is constructed in an Osaka office, for example. The management system 500ab manages the state of the terminals (10aa, 10ab, . . . 10ba, 10bb, . . . ) connected to the LAN 2a or the LAN 2b and controls the connection between the terminals 10 using the relaying apparatuses (30a, 30b).

The terminals (10ca, 10bb, . . . ), the relaying apparatus 30c, and the router 70c are communicably connected via a LAN 2c. The terminals (10da, 10db, . . . ), the relaying apparatus 30d, and the router 70d are communicably connected via a LAN 2d. The management system 500cd, the LAN 2c, and the LAN 2d are communicably connected via an exclusive line 2cd including the router 70cd and are constructed in a given region B. The region B is the United States of America, the LAN 2c is constructed in a New York office, and the LAN 2d is constructed in a Washington D.C. office, for example. The region A and the region B are communicably connected via the Internet 2i from the routers (70ab, 70cd), respectively. The management system 500cd manages the state of the terminals (10ca, 10cb, . . . 10da, 10db, . . . ) connected to the LAN 2c or the LAN 2d and controls the connection among the terminals 10 using the relaying apparatuses (30c, 30d).

The selecting apparatus 80, the program providing system 90, and the maintenance system 100 are communicably connected with the terminal 10, the relaying apparatus 30, or the management system 500 via the Internet 2i. The selecting apparatus 80, the program providing system 90, and the maintenance system 100 may be installed in the region A or the region B or may be installed in any region other than these regions.

In the present embodiment, the communication network 2 according to the present embodiment is constructed by the LAN 2a, the LAN 2b, the exclusive line 2ab, the Internet 2i, the exclusive line 2cd, the LAN 2c, and the LAN 2d. The communication network 2 may include a part in which, not only wired, but also wireless communication such as Wireless Fidelity (WiFi) and Bluetooth (registered trademark) is performed.

The terminals 10 may be used in, not only communication between a plurality of offices and communication between different rooms in the same office, but also communication within the same room and outdoor-to-indoor or outdoor-to-outdoor communication. When the terminals 10 are used outdoor, wireless communication such as mobile phone communication network is performed.

Hardware Configuration of Embodiment

Figure 3:
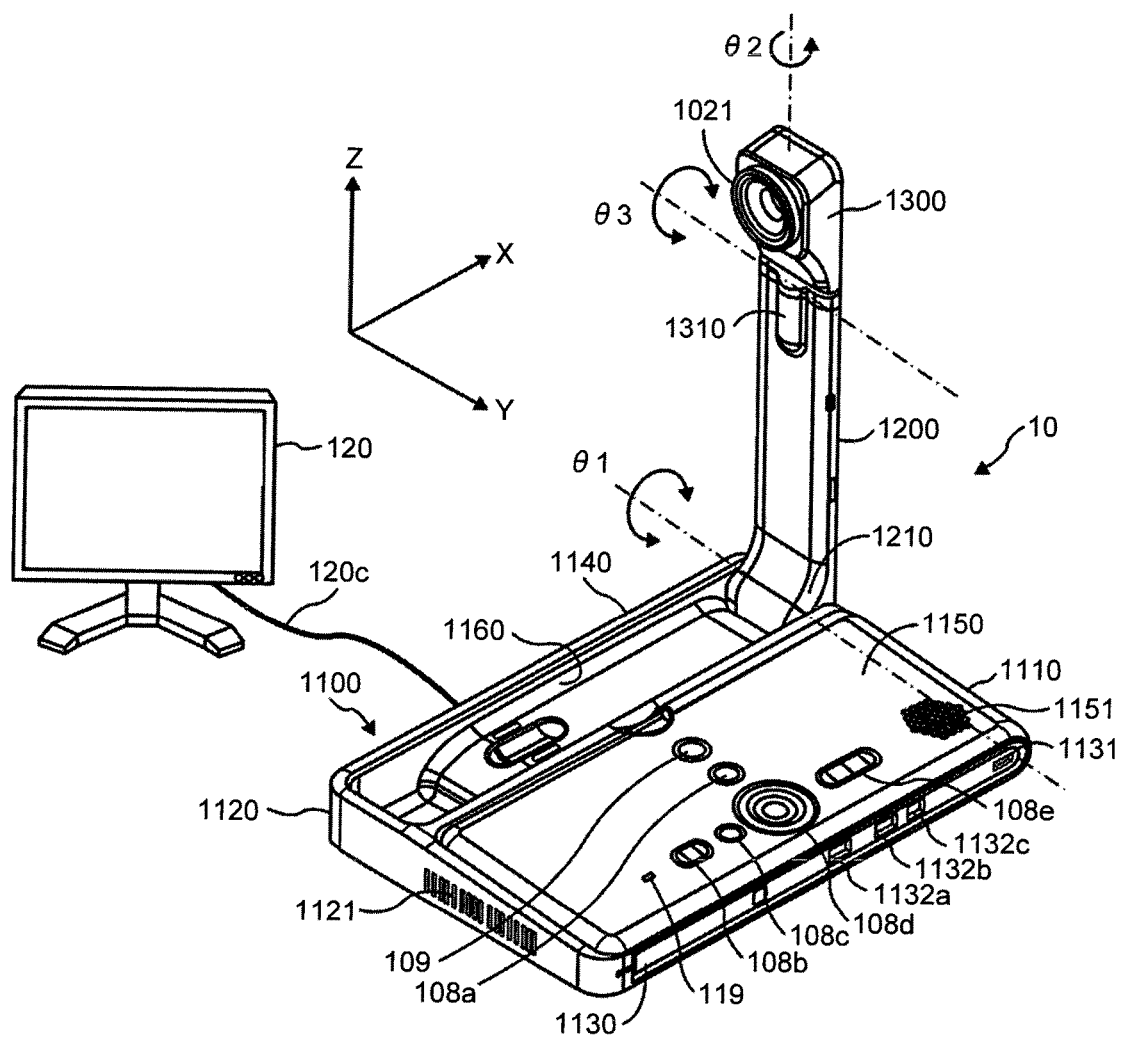
FIG. 3 is an external view of a terminal according to the embodiment of the present invention.
Figure 4:
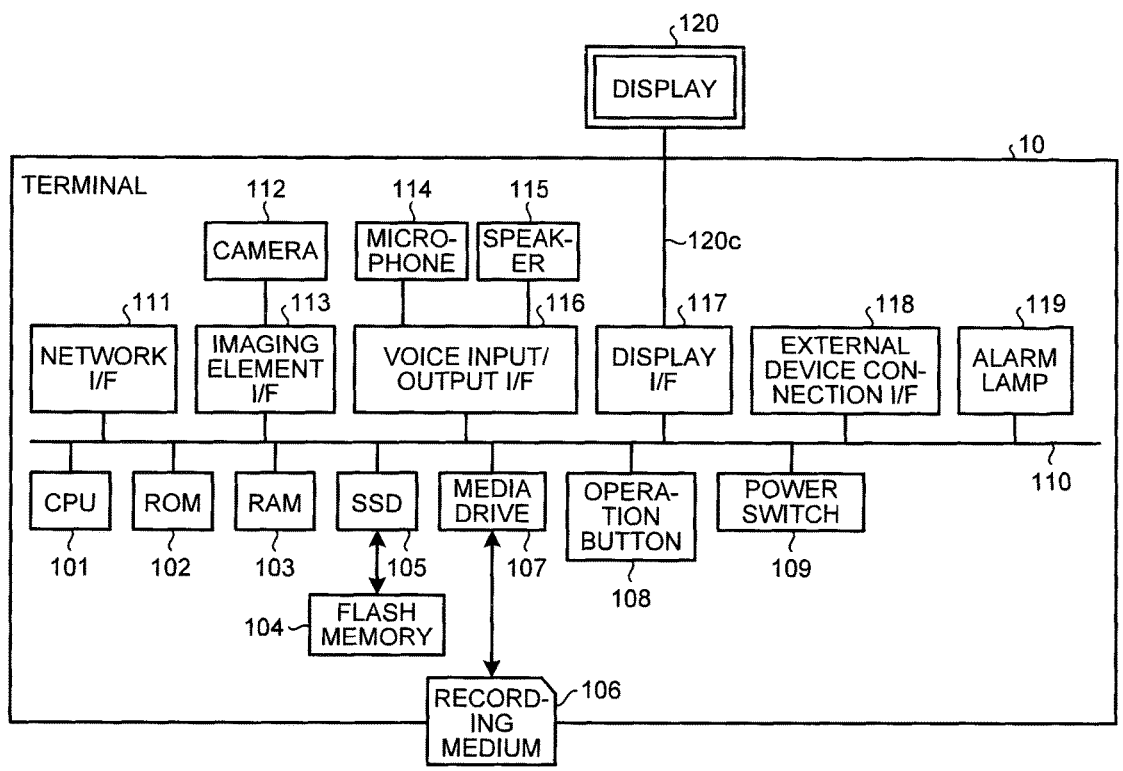
FIG. 4 is a hardware configuration diagram of the terminal according to the embodiment of the present invention.

Next, the hardware configuration of the present embodiment will be described. First, the hardware configuration of the terminal 10 will be described with reference to FIG. 3 and FIG. 4. FIG. 3 is an external view of a terminal according to the embodiment of the present invention. FIG. 4 is a hardware configuration diagram of the terminal according to the embodiment of the present invention. The following will describe with the longitudinal direction of the terminal 10 as an X-axial direction, with the direction orthogonal to the X-axial direction on the horizontal plane as a Y-axial direction, and with the direction (the vertical direction) orthogonal to the X-axial direction and the Y-axial direction as a Z-axial direction.

As illustrated in FIG. 3, the terminal 10 includes a housing 1100, an arm 1200, and a camera housing 1300. An intake plane (not illustrated) formed by a plurality of intake holes is formed on a front wall 1110 of the housing 1100, whereas an exhaust plane 1121 formed by a plurality of exhaust holes is formed on a rear wall 1120 of the housing 1100. This takes in outside air in the rear of the terminal 10 via the intake plane (not illustrated) and exhausts it to the rear of the terminal 10 via the exhaust plane 1121 by the drive of a cooling fan incorporated in the housing 1100. A sound pickup hole 1131 is formed on a right wall 1130 of the housing 1100, and sounds such as voices, sounds, and noises can be picked up by a built-in microphone 114 described below.

An operating panel 1150 is formed on the right wall 1130 of the housing 1100. The operating panel 1150 includes a plurality of operation buttons (108a to 108e) described below, a power switch 109 described below, an alarm lamp 119 described below, and a sound output plane 1151 formed by a plurality of sound output holes for passing through output sounds from a built-in speaker 115 described below. A housing unit 1160 as a recess for housing the arm 1200 and the camera housing 1300 is formed on a left wall 1140 of the housing 1100. A plurality of connecting ports (1132a to 1132c) are formed on the right wall 1130 of the housing 1100 for electrically connecting cables to an external device connection I/F 118 described below. A connecting port (not illustrated) is formed on the left wall 1140 of the housing 1100 for electrically connecting a cable 120c for the display 120 to the external device connection I/F 118 described below.

In the following description, an "operation button 108" will be used when indicating any operation button among the operation buttons (108a to 108e), and a "connecting port 1132" will be used when indicating any connecting port among the connecting ports (1132a to 1132c).

The arm 1200 is attached to the housing 1100 via a torque hinge 1210, and the arm 1200 is rotatable in the up and down direction within the range of a tilt angle θ1 of 135 degrees with respect to the housing 1100. FIG. 3 illustrates a state in which the tilt angle θ1 is 90 degrees.

The camera housing 1300 includes a built-in camera 112 described below, which can image users, documents, rooms, or the like. The camera housing 1300 forms a torque hinge 1310. The camera housing 1300 is attached to the arm 1200 via the torque hinge 1310. The camera housing 1300 is attached to the arm 1200 via the torque hinge 1310, and the camera housing 1300 is rotatable with respect to the arm 1200 in the up and down and right and left directions within the range of a pan angle θ2 of ±180 degrees and within the range of a tilt angle θ3 of ±45 degrees with the state illustrated in FIG. 3 as 0 degree.

As illustrated in FIG. 4, the terminal 10 according to the present embodiment includes a central processing unit (CPU) 101 that controls the entire operation of the terminal 10, a read only memory (ROM) 102 that stores therein the program for terminals, a random access memory (RAM) 103 used as a work area of the CPU 101, a flash memory 104 that stores therein various types of data such as image data and voice data, a solid state drive (SSD) 105 that controls the reading and writing of the various types of data from and into the flash memory 104 in accordance with the control of the CPU 101, a media drive 107 that controls the reading and writing (recording) data from and into a recording medium 106 such as a flash memory, the operation button 108 used when selecting a destination of the terminal 10 or the like, the power switch 109 for switching ON/OFF of the power of the terminal 10, and a network interface (I/F) 111 for performing data communication using the communication network 2 described below.

The terminal 10 also includes the built-in camera 112 that images a subject in accordance with the control of the CPU 101 and obtains image data, an imaging element I/F 113 that controls the drive of the camera 112, the built-in microphone 114 that inputs voices, the built-in speaker 115 that outputs voices, an voice input/output I/F 116 that processes the input and output of voice signals between the microphone 114 and the speaker 115 in accordance with the control of the CPU 101, a display I/F 117 that communicates image data to the external display 120 in accordance with the control of the CPU 101, an external device connection I/F 118 for connecting various external devices, the alarm lamp 119 indicating abnormalities of the various functions of the terminal 10, and a bus line 110 such as an address bus and a data bus for electrically connecting the above components as illustrated in FIG. 4.

The display 120 is a display unit including liquid crystals or organic EL displaying images of subjects, operating icons, or the like. The display 120 is connected to the display I/F 117 via the cable 120c. The cable 120c may be an analog RGB (VGA) signal cable, may be a component video cable, and may be a High-Definition Multimedia Interface (HDMI) or Digital Video Interactive (DVI) signal cable.

The camera 112 includes a lens and a solid-state imaging element that converts light into electric charges to digitize an image (video) of a subject, the solid-state imaging element being a complementary metal oxide semiconductor (CMOS), a charge coupled device (CCD), or the like.

External devices such as an external camera, an external microphone, and an external speaker can be electrically connected to the external device connection I/F 118 with a universal serial bus (USB) cable or the like inserted into the connecting port 1132 of the housing 1100 illustrated in FIG. 3. When the external camera is connected, the external camera is driven preferentially to the built-in camera 112 in accordance with the control of the CPU 101. Similarly, when the external microphone is connected, or when the external speaker is connected, the external microphone and the external speaker are driven preferentially to the built-in microphone 114 and the built-in speaker 115, respectively, in accordance with the control of the CPU 101.

The recording medium 106 is attachable and detachable to and from the terminal 10. It is only required to be a nonvolatile memory that reads and writes data in accordance with the control of the CPU 101. Without being limited to the flash memory 104, it may be an electrically erasable and programmable ROM (EEPROM) or the like.

The program for terminals may be recorded in a computer-readable recording medium (the recording medium 106 or the like) as an installable or executable file and distributed. The program for terminals may be stored in the ROM 102 rather than the flash memory 104. The external view and the hardware configuration diagram illustrated in FIG. 3 and FIG. 4 are merely an embodiment and are not limiting. The appearance and hardware may be, for example, a general desktop or notebook personal computer, a smartphone, a tablet type terminal, an electronic blackboard, a projector, and image forming apparatuses such as a multifunction peripheral and a printer. In this case, a camera and a microphone are not necessarily required to be built in and may be externally attached.

Figure 5:
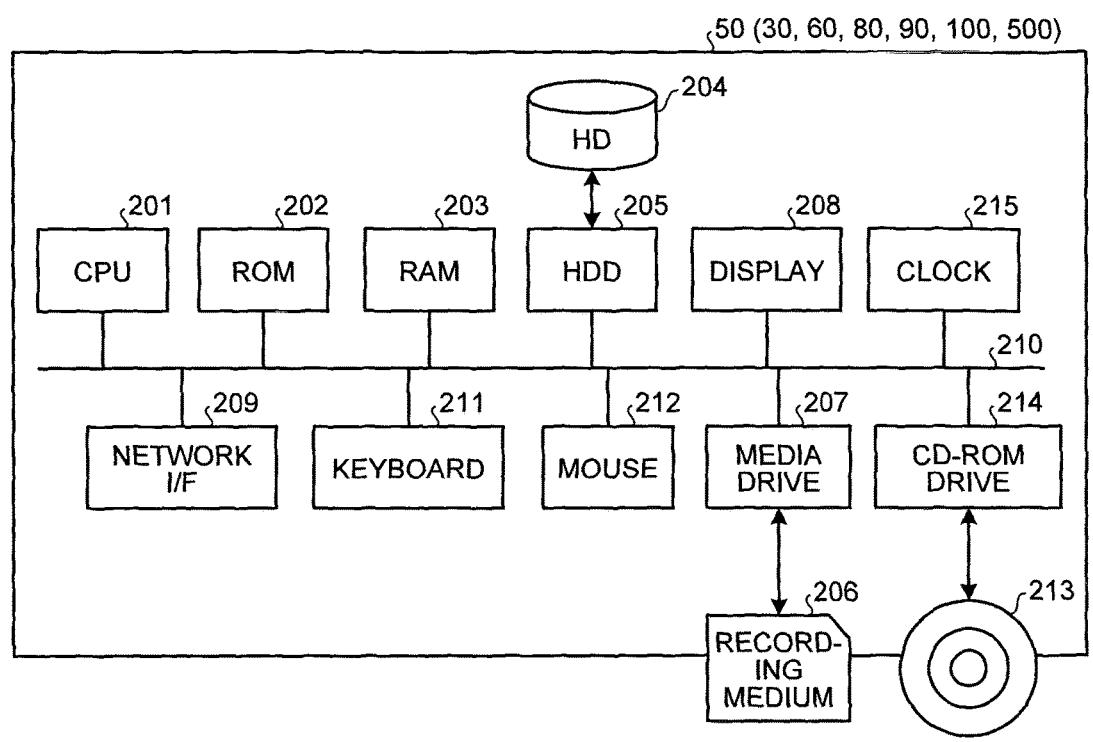
FIG. 5 is a hardware configuration diagram of a management system according to the embodiment of the present invention.

The following describes the hardware configuration of the controller 50, a management apparatus 60, the relaying apparatus 30, the selecting apparatus 80, the program providing system 90, the maintenance system. 100, and the management system 500 with reference to FIG. 5. FIG. 5 is a hardware configuration diagram of a controller according to the embodiment of the present invention. The relaying apparatus 30, the management apparatus 60, the selecting apparatus 80, the program providing system 90, and the maintenance system 100 have the same appearance as a general server computer, and the description of their appearance is omitted.

The management apparatus 60 includes a CPU 201 that controls the entire operation of the management apparatus 60, a ROM 202 that stores therein a program for use in the drive of the CPU 201 such as an initial program loader (IPL), a RAM 203 used as a work area of the CPU 201, an HD 204 that stores therein various types of data such as a program for communication management, a hard disk drive (HDD) 205 that controls the reading and writing of the various types of data from and into the HD 204 in accordance with the control of the CPU 201, a media drive 207 that controls the reading and writing (recording) of data from and into a recording medium 206 such as a flash memory, a display 208 that displays various types of information such as cursors, menus, windows, characters, and images, a network I/F 209 for performing data communication using the communication network 2, a keyboard 211 having a plurality of keys for inputting characters, numeric values, various instructions, and the like, a mouse 212 that performs the selection and execution of various instructions, the selection of an object to be processed, the movement of a cursor, and the like, a CD-ROM drive 214 that controls the reading and writing of various types of data from and into a compact disc read only memory (CD-ROM) 213 as an example of a detachable recording medium, a clock 215 as an internal clock of the management apparatus 60, and a bus line 210 such as an address bus and a data bus for electrically connecting the above components as illustrated in FIG. 5.

The program for communication management may be recorded in a computer-readable recording medium such as the recording medium 206 and the CD-ROM 213 as an installable or executable file and distributed. The program for communication management may be stored in the ROM 202 rather than the HD 204.

The relaying apparatus 30, the controller 50, the selecting apparatus 80, the program providing system 90, the maintenance system 100 have the same hardware configuration as the management apparatus 60, and the detailed description thereof is omitted. The HD 204 records therein the program for relaying apparatuses, the program for communication control, the program for a selecting apparatus, a program for program provision, or a program for maintenance for controlling the relaying apparatus 30, the selecting apparatus 80, the program providing system 90, or the maintenance system 100. Also in this case, the programs may be recorded in a computer-readable recording medium such as the recording medium 206 and the CD-ROM 213 as an installable or executable file and distributed. The programs may be stored in the ROM 202 rather than the HD 204. The programs may be recorded in a computer-readable recording medium such as a compact disc recordable (CD-R) and a digital versatile disc (DVD), which are other examples of the detachable recording medium and provided.

Functional Configuration of Embodiment

Figure 6:
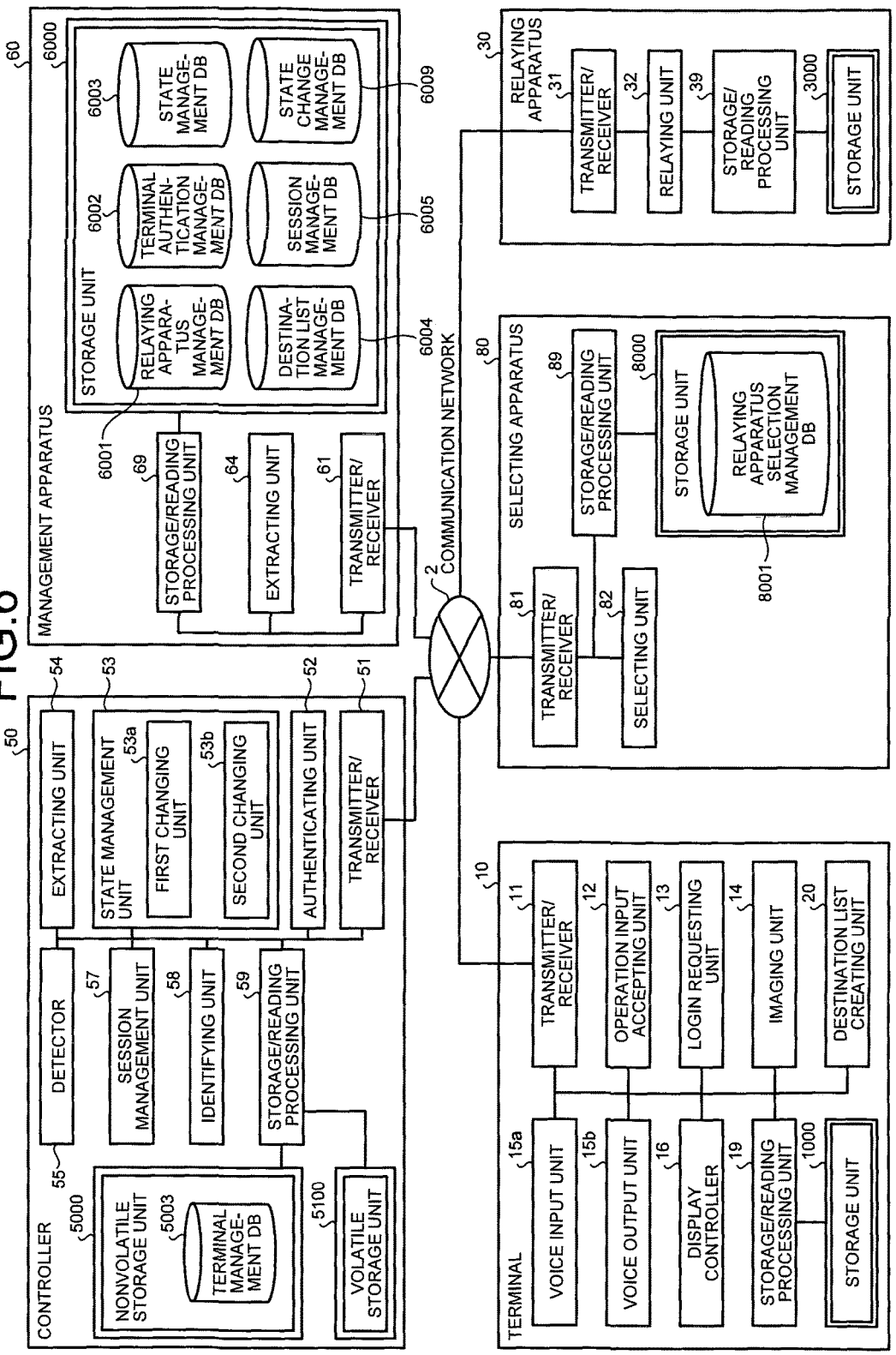
FIG. 6 is a functional block diagram of a terminal, apparatuses, and a system constituting the communication system according to the embodiment.

Next, the functional configuration of the present embodiment will be described with reference to FIG. 6. FIG. 6 is a functional block diagram of a terminal, apparatuses, and a system constituting the communication system according to the embodiment. In FIG. 6, the terminal 10, the relaying apparatus 30, and the management system 500 are connected so as to perform data communication via the communication network 2. The program providing system 90 and the maintenance system 100 illustrated in FIG. 1 are omitted in FIG. 6, because they are not directly related to communication in a teleconference.

Functional Configuration of Terminal

Figure 7:
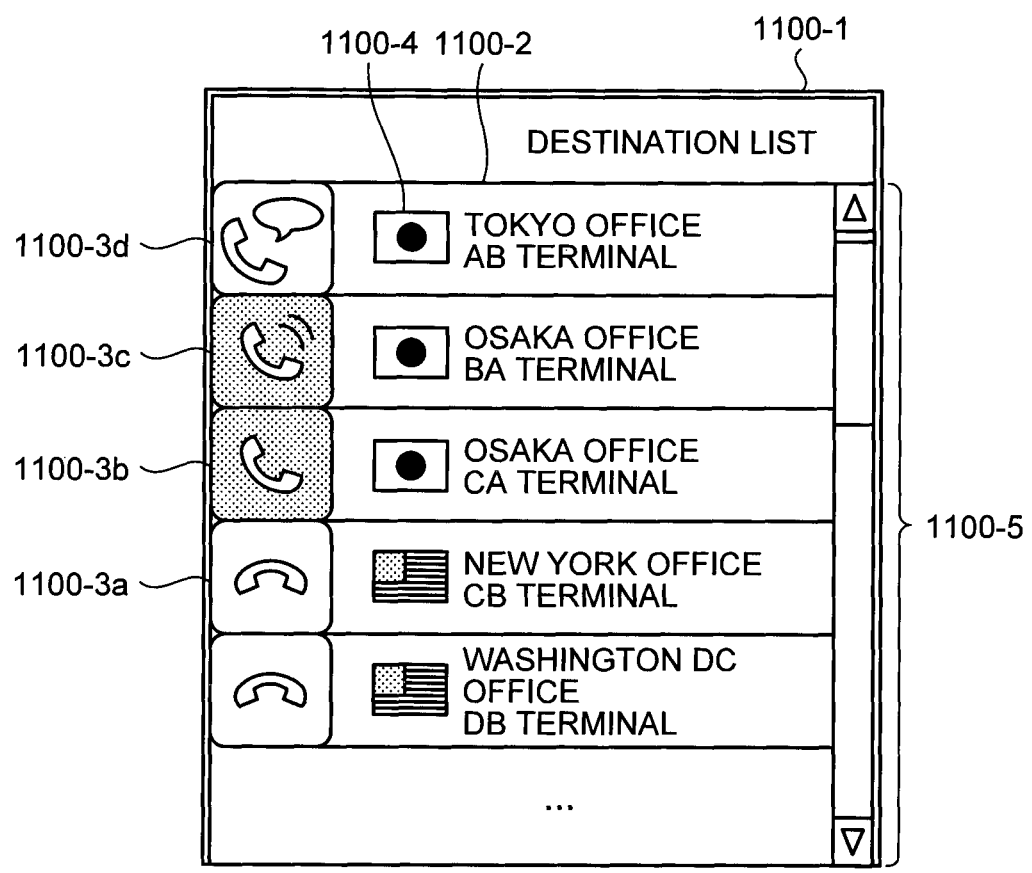
FIG. 7 is a conceptual diagram illustrating a destination list.

The terminal 10 includes a transmitter/receiver 11, an operation input accepting unit 12, a login requesting unit 13, an imaging unit 14, a voice input unit 15*a*, a voice output unit 15*b*, a display controller 16, a storage/reading processing unit 19, and a destination list creating unit 20. These components are functions or means that function implemented by the operation of any of the components illustrated in FIG. 4 by commands from the CPU 101 in accordance with the program for terminals loaded from the flash memory 104 onto the RAM 103. The terminal 10 includes a storage unit 1000 including the RAM 103 illustrated in FIG. 4 and the flash memory 104 illustrated in FIG. 4. The storage unit 1000 stores therein a destination list frame 1100-1 illustrated in FIG. 7. FIG. 7 is a conceptual diagram illustrating a destination list.

Functional Components of Terminal

Next, the functional configurations of the terminal 10 will be described with reference to FIG. 4 and FIG. 6. In describing the functional configurations of the terminal 10, the following will also describe the relation with principal components for achieving the functional configurations of the terminal 10 among the components illustrated in FIG. 4.

The transmitter/receiver 11 is implemented by commands from the CPU 101 illustrated in FIG. 4 and the network I/F 111 illustrated in FIG. 4 and performs the transmission and reception of various types of data (or information) with the other terminals, apparatuses, or systems via the communication network 2. The transmitter/receiver 11 starts the reception of respective pieces of state information indicating the states of the respective terminals 10 as destination candidates from the management system 500 before starting communication with the other terminal 10. This state information indicates the operation states (being online or offline, whether being in conference when being online, or the like) of the respective terminals 10. The state information indicates not only the operation states of the respective terminal 10, but also various states, in which the cable 120*c* is detached from the terminal 10, images are not output although voices are output, and voices are not output (mute) in the terminal 10. The following also describe a case in which the state information indicates the operation state, as an example.

The operation input accepting unit 12 is implemented by commands from the CPU 101 illustrated in FIG. 4 and the operation button 108 and the power switch 109 illustrated in FIG. 4 and receives various pieces of input from a user. When the user turns on the power switch 109 illustrated in FIG. 4, the operation input accepting unit 12 illustrated in FIG. 6 receives the power-on and turns on the power.

The login requesting unit 13 is implemented by commands from the CPU 101 illustrated in FIG. 4. With the acceptance of the power-on as a trigger, the login-requesting unit 13 automatically transmits login request information indicating a request for a login from the transmitter/receiver 11 to the management system 500 via the communication network 2. The trigger for transmitting the login request information is not limited to the power-on and may be the acceptance of operation input by the user via the operation input accepting unit 12. When the user turns off the power switch 109 from the power-on state, the transmitter-/receiver 11 transmits state information indicating the turning off of the power to the management system 500, and then the operation input accepting unit 12 perfectly turns off the power. This causes the management system 500 to grasp that the terminal 10 has been turned from the power-on to power-off. In the present embodiment, the terminals (10*aa*, 10*ab*, . . . 10*ba*, 10*bb*, . . . ) on the LANs (2*a*, 2*b*) are connected to the management system 500*ab*, whereas the terminals (10*ca*, 10*cb*, . . . 10*da*, 10*db*, . . . ) on the LANs (2*c*, 2*d*) are connected to the management system 500*cd*.

The imaging unit 14 is implemented by commands from the CPU 101 illustrated in FIG. 4 and the camera 112 and the imaging element I/F 113 illustrated in FIG. 4, images a subject, and outputs image data obtained by the imaging.

The voice input unit 15*a* is implemented by commands from the CPU 101 illustrated in FIG. 4 and the voice input/output I/F 116 illustrated in FIG. 4, and after a voice of the user is converted into a voice signal by the microphone 114, inputs voice data related to the voice signal. The voice output unit 15*b* is implemented by commands from the CPU 101 illustrated in FIG. 4 and the voice input/output I/F 116 illustrated in FIG. 4, outputs a voice signal related to voice data to the speaker 115, and outputs a voice from the speaker 115.

The display controller 16 is implemented by commands from the CPU 101 illustrated in FIG. 4 and the display I/F 117 illustrated in FIG. 4 and performs control to transmit received image data to the display 120.

The display controller 16 causes the display 120 to display a destination list including destination names based on information received from the management system 500. The display controller 16 displays the destination list frame 1100-1 as illustrated in FIG. 7 on the display 120, for example. The destination list frame 1100-1 displays destination names such as a destination name "Tokyo Office AB terminal" 1100-2, icons (1100-3*a*, 1100-3*b*, 1100-3*c*, 1100-3*d*) indicating the state of the terminal 10 for each destination name, and an icon 1100-4 indicating a region. The icon 1100-3*a* indicates that the terminal 10 as one of the destination candidates is in an offline state (hereinafter, this state is called "Offline.") and that it is incommunicable with this terminal. The icon 1100-3b indicates that the terminal 10 as one of the destination candidates is in a standby state before starting communication (hereinafter, this state is called "None.") The icon 1100-3c indicates that the terminal 10 as one of the destination candidates is in a state requesting communication with the other terminal (hereinafter, this state is called "Calling.") or a state being requested from the other terminal 10 (hereinafter, this state is called "Ringing."). The icon 1100-3d indicates a state in which the above request is accepted (hereinafter, this state of the terminal 10 is called "Accepted.") or a state in which the terminal 10 as one of the destination candidates is in communication with the other terminal 10 (hereinafter, this state is called "Busy.") The destination list frame 1100-1 displays a scroll bar 1100-5 on the right, and upward and downward triangle icons are selected, thereby displaying destination names and state of destination candidates not illustrated in FIG. 7.

The storage/reading processing unit 19 is implemented by commands from the CPU 101 illustrated in FIG. 4 and the SSD 105 illustrated in FIG. 4 or implemented by commands from the CPU 101 and performs storing various types of data in the storage unit 1000 and reading the various types of data stored in the storage unit 1000. The storage unit 1000 stores therein terminal identification information (terminal IDs) for identifying the terminal 10, passwords, and the like. The storage unit 1000 stores therein image data and voice data received each time communication with a destination terminal is performed in an overwriting manner for each reception. An image is displayed on the display 120 based on image date before being overwritten, and a voice is output from the speaker 115 based on voice data before being overwritten. The IDs such as the terminal IDs in the present embodiment indicate identification such as languages, characters, symbols, and various kinds of marks used for uniquely identifying the terminal 10, the user of the terminal 10, or the like. The IDs may be identification obtained by combining at least two of the languages, characters, symbols, and various kinds of marks.

The destination list creating unit 20 creates and updates a destination list indicating the states of the terminals 10 as destination candidates with icons as illustrated in FIG. 7 based on information received from the management system 500.

Functional Configuration of Relaying Apparatus

The relaying apparatus 30 includes a transmitter/receiver 31, a relaying unit 32, and a storage/reading processing unit 39. These components are functions or means that function implemented by the operation of any of the components illustrated in FIG. 5 by commands from the CPU 201 in accordance with the program for relaying apparatuses loaded from the HD 204 onto the RAM 203. The relaying apparatus 30 includes a storage unit 3000 including the RAM 203 illustrated in FIG. 5 or the HD 204 illustrated in FIG. 5.

Functional Components of Relaying Apparatus

Next, the functional components of the relaying apparatus 30 will be described in detail. In describing the functional configurations of the relaying apparatus 30, the following will also describe the relation with principal components for achieving the functional configurations of the relaying apparatus 30 among the components illustrated in FIG. 5.

The transmitter/receiver 31 of the relaying apparatus 30 illustrated in FIG. 6 is implemented by commands from the CPU 201 illustrated in FIG. 5 and the network I/F 209 illustrated in FIG. 5 and performs the transmission and reception of various types of data (or information) with the other terminals, apparatuses, or systems via the communication network 2. The relaying unit 32 is implemented by commands from the CPU 201 illustrated in FIG. 5 and relays content data transmitted and received among the terminals 10 in the session sed for content data via the transmitter/receiver 31. The storage/reading processing unit 39 is implemented by commands from the CPU 201 illustrated in FIG. 5 and the HDD 205 illustrated in FIG. 5 and performs storing various types of data in the storage unit 3000 and reading the various types of data stored in the storage unit 3000.

Functional Configuration of Management Apparatus

The management apparatus 60 includes a transmitter/receiver 61, an extracting unit 64, and a storage/reading processing unit 69. These components are functions or means that function implemented by the operation of any of the components illustrated in FIG. 5 by commands from the CPU 201 in accordance with the program for a management system loaded from the HD 204 onto the RAM 203. The management apparatus 60 includes a storage unit 6000 including the HD 204 illustrated in FIG. 5.

Relaying Apparatus Management Table

The storage unit 6000 includes a relaying apparatus management DB 6001 including a relaying apparatus management table as illustrated in FIGS. 8A and 8B. FIG. 8A is a conceptual diagram illustrating a relaying apparatus management table managed by the management apparatus 60ab, whereas FIG. 8B is a conceptual diagram illustrating a relaying apparatus management table managed by the management apparatus 60cd. The relaying apparatus management table manages relaying apparatus IDs of the respective relaying apparatuses 30 for which the control of connection can be performed by the management system 500 to which the corresponding management apparatus 60 belongs and passwords for connecting to the respective relaying apparatuses 30 in association with each other. The relaying apparatus management table illustrated in FIG. 8A, for example, indicates that the password for connecting to the relaying apparatus 30a identified by the relaying apparatus ID "111a@jp.oo.com" is "xxxx." In the present embodiment, the relaying apparatus ID includes domain information (communication control information) such as "jp.oo.com" indicating the management system 500 that can perform control along with the start and end of communication using the relaying apparatus 30 identified thereby. When indicating the relaying apparatus ID in the following description, it will be simply denoted as "111a" or the like with the domain information such as "jp.oo.com" omitted, unless particularly specified. The following describes a case of using the relaying apparatus ID as information used for connecting to the relaying apparatus as an embodiment according to the present invention. However, any information used in the control of connection to the relaying apparatus 30 in the controller 50 is used as the information for connecting to the relaying apparatus without being limited to the relaying apparatus ID.

Terminal Authentication Management Table

The storage unit 6000 further includes a terminal authentication management DB 6002 including a terminal authentication management table as illustrated in FIGS. 9A and 9B. FIG. 9A is a conceptual diagram illustrating a terminal authentication management table managed by the management apparatus 60ab, whereas FIG. 9B is a conceptual diagram illustrating a terminal authentication management table managed by the management apparatus 60cd. The terminal authentication management table manages respective terminal IDs of all terminals 10 connected to the management system 500 to which the corresponding management apparatus 60 belongs and respective passwords in association with each other. The terminal authentication management table illustrated in FIG. 9A, for example, indicates that the terminal ID of a terminal 10aa is "01aa@jp1.oo.com" and that the password is "aaaa." In the present embodiment, the terminal ID includes domain information (terminal connection information) such as "jp1.oo.com" indicating the controller 50 to which the terminal 10 identified thereby connects. When indicating the terminal ID in the following description, it will be simply denoted as "01aa" or the like with the domain information such as "jp1.oo.com" omitted, unless particularly specified. The terminal ID indicated in this example is merely an example of information for use in authentication, and this table is only required to include at least identification for identifying the terminal 10 or the user of the terminal 10 and information for identifying the controller 50 to which the terminal 10 connects and is not limited to this form.

State Management Table

The storage unit 6000 includes a state management DB 6003 including a state management table as illustrated in FIG. 10. FIG. 10 is a conceptual diagram illustrating a state management table. The state management table manages the terminal IDs of the respective terminals 10 managed by the management system 500ab and pieces of state information indicating the states of communication of the terminals 10 in association with each other. The state management table illustrated in FIG. 10 illustrates that the state information of the terminal 10aa with the terminal ID "01aa" is "None," for example.

The pieces of state information managed by the state management table are described. The state information "None" indicates a standby state before starting communication. The state information "Inviting" indicates a state in which the terminal 10 is requesting communication with the other terminal. The state information "Invited" indicates a state in which communication is being requested by the other terminal 10. The state information "Ringing" indicates a state in which the terminal 10 is outputting a dial tone. The state information "Calling" indicates a state in which the terminal 10 is outputting a ring tone. The information "Accepted" indicates a state in which a communication request is permitted. The information "Busy" indicates a state in which the terminal 10 is in communication with the other terminal 10.

Destination List Management Table

The storage unit 6000 includes a destination list management DB 6004 including a destination list management table as illustrated in FIGS. 11A and 11B. FIG. 11A is a conceptual diagram illustrating a destination list management table managed by the management apparatus 60ab, whereas FIG. 11B is a conceptual diagram illustrating a destination list management table managed by the management apparatus 60cd. The destination list management table manages the terminal ID of the terminal 10 connected to the management system 500 to which the corresponding management apparatus 60 belongs and as a requester terminal of the start of communication and all terminal IDs of the terminals 10 registered as communicable destination candidates in association with each other. The destination list management table illustrated in FIG. 11A, for example, indicates that destination candidates the terminal 10aa with the terminal ID "01aa" as the requester terminal can request the start of communication in a teleconference are the terminal 10ab with the terminal ID "01ab" and the like. The destination list management table also manages the terminal ID of the terminal 10 connected to the other management system 500 as the terminal ID of the terminal 10 as a destination candidate. This enables, for example, the terminal 10aa connected to the management system 500ab to select the terminal 10db connected to the management system 500cd as a destination. The destination candidates are updated by addition or deletion through requests for addition or deletion from any terminal 10 to the management system 500.

Session Management Table

The storage unit 6000 includes a session management DB 6005 including a session management table as illustrated in FIGS. 12A and 12B. FIG. 12A is a conceptual diagram illustrating a session management table managed by the management apparatus 60ad, whereas FIG. 12B is a conceptual diagram illustrating a session management table managed by the management apparatus 60cd. The session management table manages session IDs for identifying the session sed for content data between terminals 10, relaying apparatus IDs for identifying the relaying apparatus 30 for relaying the content data in the session sed for content data, and terminal IDs for identifying the terminals 10 that are performing communication in the session sed for data content in association with each other. The session ID may be identification such as conference ID, communication ID, and call ID identifying events such as a conference, communication, a call corresponding to the session sed for content data. The session management table illustrated in FIG. 12A, for example, indicates that the relaying apparatus 30a with the relaying apparatus ID "111a" is relaying content data between terminals (10aa, 10bd) in the session sed for content data identified by the session ID "se01@jp.oo.com." In the present embodiment, the session ID includes domain information (communication control information) such as "jp.oo.com" indicating the management system 500 that can perform control along with the start and end of communication with a session sed for content data identified thereby. When indicating the session ID in the following description, it will be simply denoted as "se01" or the like with the domain information such as "jp.oo.com" omitted, unless particularly specified.

State Change Management Table

The storage unit 6000 includes a state change management DB 6009 including a state change management table as illustrated in FIGS. 13A and 13B. FIGS. 13A and 13B are conceptual diagrams illustrating the state change management tables. The state change management table illustrated in FIG. 13A manages pieces of management information transmitted from the terminal 10, pieces of pre-change state information indicating pre-change states of the terminal 10, and pieces post-change state information indicating post-change states of the terminal 10 in association with each other. The management information "Call" in the state change management table in FIG. 13A indicates that, when the session sed for content data is established between the terminals 10, the other terminal 10 requests to participate in this session. The management information "Join" indicates that the terminal 10 requests to start relaying content data. The management information "Leave" indicates that the terminal 10 requests to end communication.

When not only the state of the terminal 10 as the transmission source, but also the state of the terminal 10 as the transmission destination is changed by performing control based on the management information, the state change management table in FIG. 13B is used. In the state change management table in FIG. 13B, terminal information indicating whether the terminal 10 whose state is changed is the transmission source or the transmission destination of the management information is managed in addition to the pieces of information in FIG. 13A in association with each other. It is indicated, for example, that when the management system 500 receives the management information "Invite," the state of communication is changed from "None" into "Inviting" for the terminal 10 as the transmission source of the management information, whereas the state of communication is changed from "None" into "Invited" for the terminal 10 as the transmission destination. The management information "Invite" indicates that the terminal 10 requests the start of communication. The management information "Ring" indicates that the terminal 10 accepts a request to start communication and sounds a dial tone. The management information "Accept" indicates that the terminal 10 permits the start of communication. The state information "Inviting" indicates a state requesting the start of communication, whereas the state information "Invited" indicates a state in which the start of communication is being requested.

Functional configurations of Management Apparatus

Next, the functional configurations of the management apparatus 60 will be described. In describing the functional configurations of the management apparatus 60, the following will also describe the relation with principal components for achieving the functional configurations of the management apparatus 60 among the components illustrated in FIG. 5.

The transmitter/receiver 61 is implemented by commands from the CPU 201 illustrated in FIG. 5 and the network I/F 209 illustrated in FIG. 5 and performs the transmission and reception of various types of data (or information) with other apparatuses or systems via the communication network 2.

The extracting unit 64 is implemented by commands from the CPU 201 illustrated in FIG. 5, searches the respective management tables of the storage unit 6000, and extracts various types of information.

The storage/reading processing unit 69 is implemented by commands from the CPU 201 illustrated in FIG. 5 and the HDD 205 illustrated in FIG. 5 and performs storing various types of data in the storage unit 6000 and reading the various types of data stored in the storage unit 6000.

Functional Configuration of Controller

The controller 50 includes a transmitter/receiver 51, an authenticating unit 52, a state management unit 53, an extracting unit 54, a detector 55, a session management unit 57, an identifying unit 58, and a storage/reading processing unit 59. These components are functions or means that function implemented by the operation of any of the components illustrated in FIG. 5 by commands from the CPU 201 in accordance with the program for a management system loaded from the HD 204 onto the RAM 203. The management system 500 includes a nonvolatile storage unit 5000 and a volatile storage unit 5100 including the HD 204 illustrated in FIG. 5.

Terminal Management Table

The nonvolatile storage unit 5000 includes a terminal management DB 5003 including a terminal management table as illustrated in FIG. 15. FIG. 15 is a conceptual diagram illustrating a terminal management table. The terminal management table manages the terminal IDs of the respective terminals 10, destination names with the respective terminals 10 as destinations, and the operation states of the respective terminals 10 in association with each other. In the present embodiment, the operation states include the state of the connection between the terminal 10 and the controller 50 (online, online (in conference), and offline). "Online" among the operation states is a state in which the terminal 10 and the controller 50 are connected, and communication with the other terminal 10 is capable. "Online (in conference)" among the operation states is a state in which the terminal 10 and the controller 50 are connected, and communication with the other terminal 10 is in progress. "Offline" among the operation states is a state in which the terminal 10 and the controller 50 are not connected, and communication with the other terminal 10 is incapable. The terminal management table illustrated in FIG. 15, for example, indicates that the destination name of the terminal 10aa with the terminal ID "01aa" is "Tokyo Office AA terminal" and the operation state thereof is "offline."

Functional Configurations of Controller

Next, the functional configurations of the controller 50 will be described in detail. In describing the functional configurations of the controller 50, the following will also describe the relation with principal components for achieving the functional configurations of the controller 50 among the components illustrated in FIG. 5.

The transmitter/receiver 51 is implemented by commands from the CPU 201 illustrated in FIG. 5 and the network I/F 209 illustrated in FIG. 5 and performs the transmission and reception of various types of data (or information) with the other terminals, apparatuses, or systems via the communication network 2. This causes the transmitter/receiver 51 to receive start request information from the terminal 10, thereby accepting a request for the start of communication. Relaying apparatus connection information for connecting to the relaying apparatus 30 is transmitted to the terminal 10, thereby performing control along with the start of communication. The transmitter/receiver 51 transmits participation notification (start information) including the terminal ID and the session ID of the terminal 10 participating in the session sed for content data to the terminal 10 that is performing communication in this session. The transmitter/receiver 51 receives or transmits post-change state information indicating the post-change state of the terminal 10.

The authenticating unit 52 is implemented by commands from the CPU 201 illustrated in FIG. 5 and performs terminal authentication by searching the terminal authentication management table (refer to FIG. 9) of the storage unit 6000 with the terminal ID and the password included in the login request information received via the transmitter/receiver 51 as search keys and determining whether the same terminal ID and password are managed in the terminal authentication management table.

The state management unit 53 is implemented by commands from the CPU 201 illustrated in FIG. 5. To manage the operation state of a requester terminal that requested a login, the state management unit 53 stores and manages the terminal IDs of the requester terminals, pieces of state information indicating the operation states of the requester terminals, and the IP addresses of the requester terminals in association with each other in the terminal management table (refer to FIG. 15). A first changing unit 53a of the state management unit 53 changes the state information managed in the terminal management table when the operation state of the terminal 10 is changed based on control by the corresponding controller 50. A second changing unit 53b of the state management unit 53 changes the state information managed in the terminal management table based on operation state information transmitted from the other controller 50 when the operation state of the terminal 10 is changed based on control by the other controller 50.

The extracting unit 54 is implemented by commands from the CPU 201 illustrated in FIG. 5 and extracts the terminal ID by searching the destination list management table (refer to FIG. 11) with the terminal ID of the requester terminal that requested a login as a key and reading the terminal ID of the terminal 10 as a destination candidate. The extracting unit 54 searches a destination management table with the terminal ID of the requester terminal that requested a login as a key and also extracts the terminal ID of the other requester terminal that registers the terminal ID of the above requester terminal as a candidate for the destination terminal.

The extracting unit 54 is implemented by commands from the CPU 201 illustrated in FIG. 5, searches the terminal management table (refer to FIG. 15) with the terminal ID of the candidate for the destination terminal as a search key, and reads the operation states of the respective terminal IDs. This enables the extracting unit 54 to extract the operation state of the candidate for the destination terminal that can communicate with the requester terminal that requested a login. The extracting unit 54 searches the terminal management table with the terminal ID as a search key and also acquires the operation state of the request source terminal that requested a login.

The detector 55 detects the disconnection of the session sei for management information between the controller 50 and the respective terminals 10.

The session management unit 57 is implemented by commands from the CPU 201 illustrated in FIG. 5, and each time the session sed for content data between the terminals 10 is newly established, generates session ID for identifying the session sed for content data. The session management unit 57 stores in the session management table (refer to FIGS. 12A and 12B) the terminal ID for identifying the terminal 10 that performs communication in this session and the relaying apparatus ID of the relaying apparatus 30 used in this session in association with each other.

The identifying unit 58 is implemented by commands from the CPU 201 illustrated in FIG. 5 and identifies the other controller 50 being in operation arranged in the same segment.

The storage/reading processing unit 59 is implemented by commands from the CPU 201 illustrated in FIG. 5 and the HDD 205 illustrated in FIG. 5 and performs to storing various types of data in the nonvolatile storage unit 5000 or the volatile storage unit 5100 and reading the various types of data stored in the nonvolatile storage unit 5000 or the volatile storage unit 5100.

Functional Configuration of Selecting Apparatus

The selecting apparatus 80 includes a transmitter/receiver 81, a selecting unit 82, and a storage/reading processing unit 89. These components are functions or means that function implemented by the operation of any of the components illustrated in FIG. 5 by commands from the CPU 201 in accordance with the program for a management system loaded from the HD 204 onto the RAM 203. The selecting apparatus 80 includes a storage unit 8000 including the HD 204 illustrated in FIG. 5.

Relaying Apparatus Selection Management Table

The storage unit 8000 includes a relaying apparatus selection management DB 8001 as an example of a communication control information management unit including a relaying apparatus selection management table as illustrated in FIG. 14. FIG. 14 is a conceptual diagram illustrating the relaying apparatus selection management table. When selecting a relaying apparatus for use in relaying information transmitted and received between the terminals 10, the relaying apparatus selection management table manages, for all relaying apparatuses 30 as candidates for selection, relaying apparatus IDs for identifying the relaying apparatuses 30. The relaying apparatus ID managed in the relaying apparatus selection management table includes domain information (communication control information) such as "jp.oo.com" indicating the management system 500 that can perform control along with the start of communication using the relaying apparatus 30 identified thereby. The relaying apparatus selection management table manages priority information indicating priority when selecting the relaying apparatus 30 identified by the relaying apparatus ID for the respective terminal IDs. The relaying apparatus selection management table illustrated in FIG. 14 indicates that when the terminal 10aa identified by the terminal ID "01aa" starts communication, the priority when selecting the relaying apparatus 30a identified by the relaying apparatus ID "111a" is "3." The priority in the relaying apparatus selection management table is set so that a higher priority gives a higher value based on a bandwidth between the terminal 10 and the relaying apparatus 30 or a delay time when information is transmitted and received between the terminal 10 and the relaying apparatus 30, for example. The priority may be calculated based on time zones used by the terminal 10 and the management system 500. In this case, the value of the priority can be set higher as the time zone used by the terminal 10 and the time zone used by the management system 500 become close to each other, for example.

Functional Configurations of Selecting Apparatus

Next, the functional configurations of the selecting apparatus 80 will be described in detail. In describing the functional configurations of the selecting apparatus 80, the following will also describe the relation with principal components for achieving the functional configurations of the selecting apparatus 80 among the components illustrated in FIG. 5.

The transmitter/receiver 81 is an example of a selection request information accepting unit and an output unit, is implemented by commands from the CPU 201 illustrated in FIG. 5 and the network I/F 209 illustrated in FIG. 5, and performs the transmission and reception of various types of data (or information) with the other terminals, apparatuses, or systems via the communication network 2. This causes the transmitter/receiver 81 to receive (accept) selection request information indicating a request to select the relaying apparatus 30 transmitted from the management system 500. The transmitter/receiver 81 transmits (outputs) the relaying apparatus ID identifying the relaying apparatus 30 selected by the selecting apparatus 80 to the management system 500.

The selecting unit 82 is an example of a relaying apparatus selection unit and a communication control information extracting unit and selects at least one relaying apparatus 30 out of a plurality of relaying apparatuses 30 as candidates based on the priority information managed in the relaying apparatus selection management table (refer to FIG. 14). The selecting unit 82 selects the relaying apparatus ID managed in the relaying apparatus selection management table, thereby also extracting the domain information included in the relaying apparatus ID.

The storage/reading processing unit 89 is implemented by commands from the CPU 201 illustrated in FIG. 5 and the HDD 205 illustrated in FIG. 5 and performs storing various data in the storage unit 8000 and reading the various data stored in the storage unit 8000.

Processing and Operation of Embodiment

Figure 16:
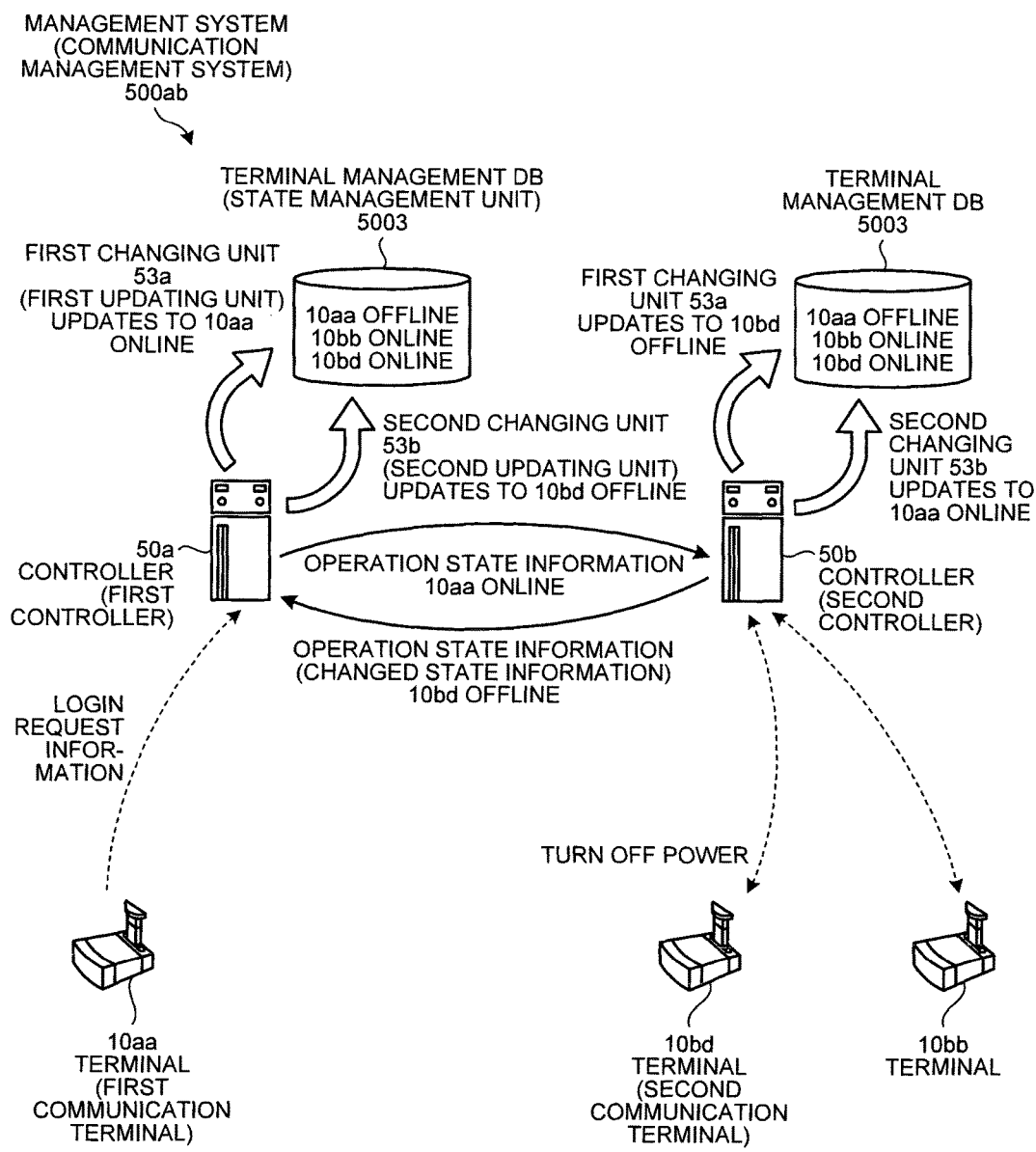
FIG. 16 is a conceptual diagram illustrating the state of the transmission and reception of various types of information in the communication system.

Next, the processing and operation of the controller 50, the management apparatus 60, and the terminal 10 will be described with reference to FIG. 16. FIG. 16 is a conceptual diagram illustrating the state of the transmission and reception of various types of information in the communication system 1.

The management system 500*ab* (an example of a control system) includes a plurality of controllers 50 that control the session sed for content data (an example of a session). The terminal management DB 5003 (an example of a state management unit) of the controller 50*a* manages an operation state (an example of state information) of each terminal 10, which indicates the state of connection between the terminal 10 and the controller 50. The terminal 10*aa* (an example of a first communication terminal) requests a login to the controller 50*a*, and thus the operation state of the terminal 10*aa* is changed into "Online." The first changing unit 53*a* (an example of a first updating unit) then changes the operation state of the terminal 10*aa* managed in the terminal management DB 5003 into "Online," thereby updating the terminal management DB 5003. When the power of the terminal 10*bd* (an example of a second communication terminal) is turned off to change the operation state of the terminal 10*bd* into "Offline," the transmitter/receiver 51 (an example of a changed state information receiver) receives operation state information (an example of changed state information) "Offline" indicating the changed operation state of the terminal 10*bd* from the other controller 50*b*. The second changing unit 53*b* (an example of a second updating unit) of the controller 50*a* changes the operation state of the terminal 10*bd* managed in the terminal management DB 5003 into "Offline" based on the operation state information received by the transmitter/receiver 51, thereby updating the terminal management DB 5003. This configuration enables the controller 50*a* to manage both the operation state of the terminal 10 connected to the controller 50*a* and the operation state of the terminal 10 connected to the other controller 50*b* in the terminal management DB 5003, which enables to control the session sed for content data between the terminals 10 based on the operation states managed in the terminal management DB 5003.

The transmitter/receiver 51 (an example of a request accepting unit) of the controllers (50*a*, 50*b*) receives the login request information or information to turn off the power transmitted from the terminals (10*aa*, 10*bd*), thereby accepting a request to connect or disconnect between the terminals (10*aa*, 10*bd*) and the controller 50*a*. This configuration enables the first changing unit 53*a* to update the operation state managed in the terminal management DB 5003 into "Online" or "Offline" based on the request accepted by the transmitter/receiver 51.

The detector 55 of the controller 50*a* detects the disconnection between the terminal 10 and the controller 50*a*. This configuration enables the first changing unit 53*a* to update the operation state related to the terminal 10*aa* managed in the terminal management DB 5003 based on the result of the detection by the detector 55.

When the state of connection between the terminal 10 and the controller 50 is changed, the transmitter/receiver 51 (an example of a transmitter) of each of the controllers 50 transmits the operation state information indicating the changed operation state (an example of the changed state information) to the other controller 50. With this configuration, when the operation state of the terminal 10 connected to the controller 50 is changed, the respective controllers 50 within the management system 500*ab* can notify the other controller of the changed operation state.

The identifying unit 58 (an example of an identifying unit) of the controller 50*a* identifies the other controller 50 within the management system 500*ab*. The transmitter/receiver 51 of the controller 50*a* transmits the operation state information to the controller 50 identified by the identifying unit 58. This configuration enables the controller 50*a* to identify the other controller 50 within the management system 500*ab* and to transmit the operation state information thereto when the other controller 50 undergoes maintenance or returns.

In this case, the transmitter/receiver 51 (an example of an identification information transmitter) of the controller 50*a* transmits search information (an example of identification information) for identifying the other controller 50 to the respective controllers 50 within the management system 500*ab*. This configuration enables the identifying unit 58 to identify the other controller 50 based on a response to the search information from any controller 50.

Next, details of processing performed in the communication system 1 according to the present embodiment will be described.

Inter-Controller Cooperation

Figure 17:
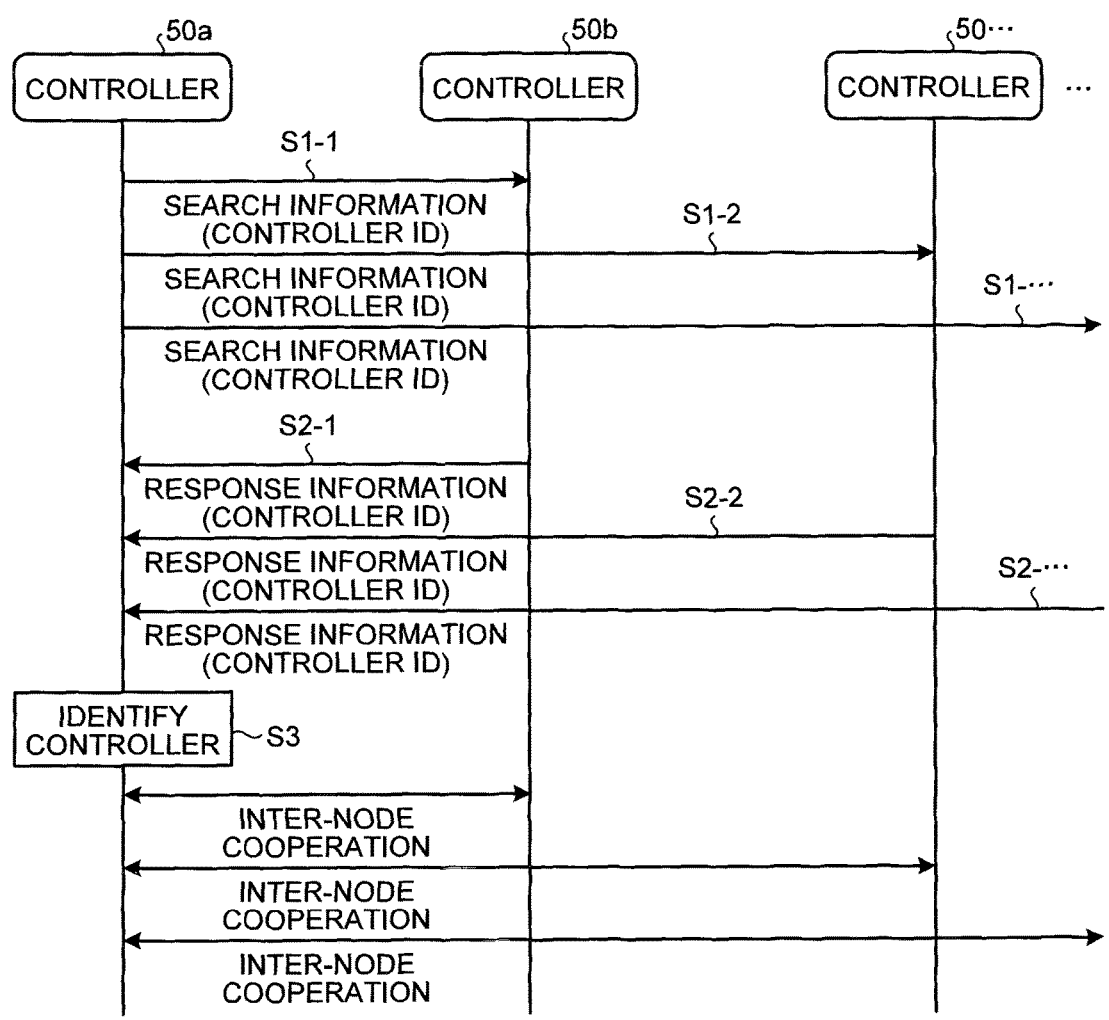
FIG. 17 is a sequence diagram illustrating inter-node cooperation processing.

First, inter-node cooperation between the controllers 50 present within the same domain will be described with reference to FIG. 17. FIG. 17 is a sequence diagram illustrating the inter-node cooperation. As illustrated in FIG. 17, the controller 50*a* performs searching for the other controller 50 located in the same segment (Steps S1-1, S1-2, S1- . . . ). In this case, the transmitter/receiver 51 of the controller 50*a* transmits, by means of broadcasting, search information for searching to the segment in which the controller 50*a* is located. The search information includes a controller ID for identifying the controller 50*a*. The transmitter/receiver 51 of each controller 50 that has received the search information from the controller 50*a* transmits response information to the controller 50*a* (Steps S2-1, S2-2, S2- . . . ). The response information includes each controller ID for identifying each controller 50 that has received the search information. When the transmitter/receiver 51 of the controller 50*a* receives the response information from the other controller 50, the identifying unit 58 identifies the other controller 50 in being operation located in the same segment based on the response information (Step S3).

When the controller 50 being in operation located in the same segment is identified at Step S3, the controller 50*a* performs the inter-node cooperation with the identified controller (50*b*, 50 . . . ). In an embodiment according to the present invention, the inter-node cooperation means that one controller 50 is regarded as a node, a plurality of controllers 50 have the same domain name, and the controllers 50 can be operated cooperatively with each other. When the controller 50*a* and the controller 50*b* perform the inter-node cooperation, for example, the controller 50*a* and the controller 50*b* operate as if they are the same controller 50. In other words, both when the terminal 10 is connected to the controller 50*a* and when it is connected to the controller 50*b*, the same processing is performed in the controllers 50*a* and 50*b*.

The inter-node cooperation at Steps S1 to S3 is performed at given time intervals. This enables the controller 50*a* to perform inter-node release when the coordinated controller 50 undergoes maintenance or goes down. This processing causes the controllers 50 in inter-node cooperation, even when inter-node cooperation or release with any controller 50 constituting the management system 50*ab* is performed, to operate as if they operate singly.

Also for the controller 50 other than the controller 50*a* constituting the management system 500*ab*, the inter-node cooperation with the other controller 50 present in the same domain is performed. This processing is similar to the processing at Steps S1 to S3, and the description thereof is omitted.

State Management

Figure 18:
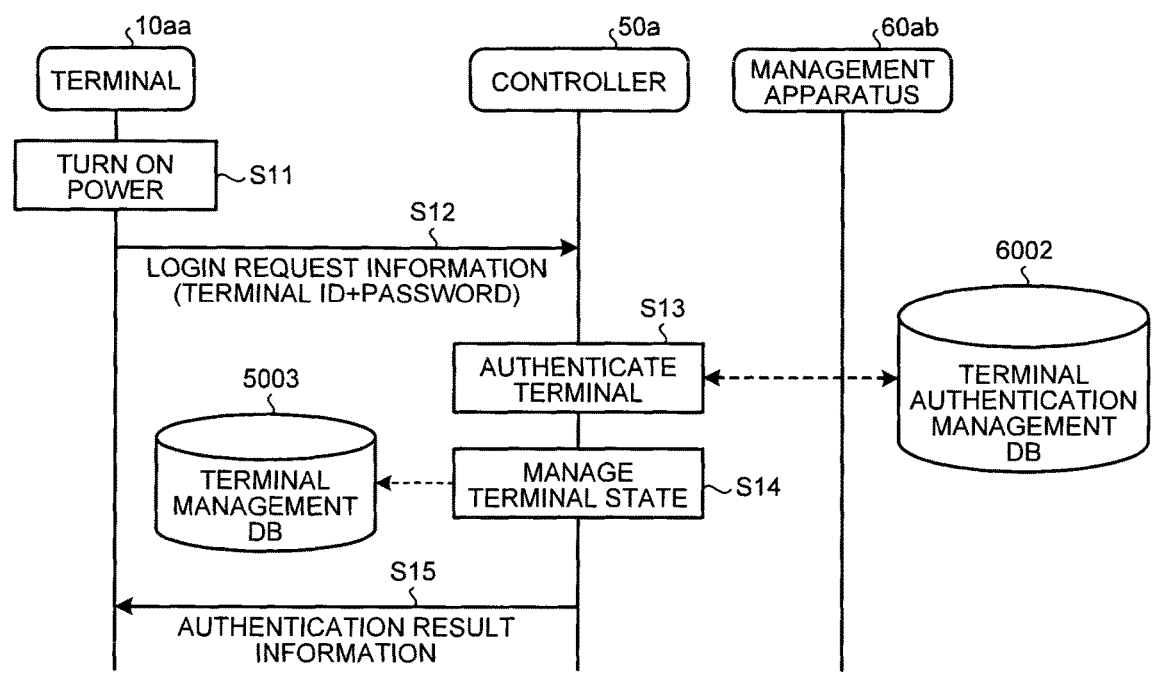
FIG. 18 is a sequence diagram illustrating the processing of a preparatory stage for starting communication between terminals.
Figure 19:
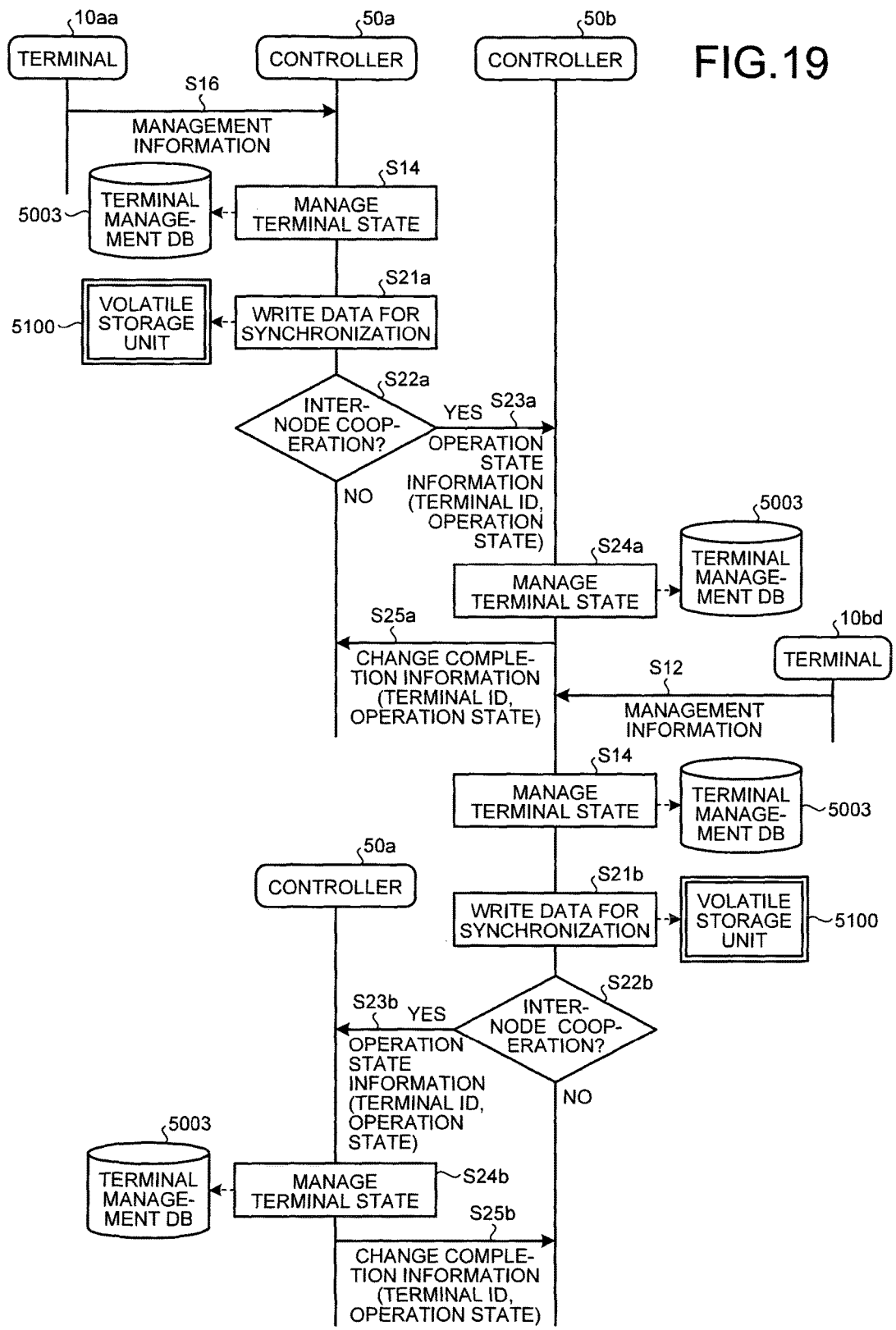
FIG. 19 is a sequence diagram illustrating processing to synchronize the operation states of terminals.

The following describes, as an example of the inter-node cooperation, processing to synchronize the operation states of the terminals 10 managed by each controllers 50 constituting the management system 500ab between the controllers 50 with reference to FIG. 18 and FIG. 19. FIG. 18 is a sequence diagram illustrating the processing in a preparatory stage for starting communication between terminals. FIG. 19 is a sequence diagram illustrating processing to synchronize the operation states of the terminals. In FIG. 18 and FIG. 19, various types of management information are transmitted and received entirely through the session sei for management information illustrated in FIG. 2.

First, when the user of the terminal 10aa turns on the power switch 109 illustrated in FIG. 4, the operation input accepting unit 12 illustrated in FIG. 6 accepts the power-on and turns on the power (Step S11). The login requesting unit 13 automatically transmits login request information indicating a login request to the controller 50a via the communication network 2 with the acceptance of the power-on as a trigger (Step S12). The trigger for transmitting the login request information is not limited to the power-on and may be the acceptance of operation input by the user via the operation input accepting unit 12. The present embodiment continues to describe on the assumption that the terminals (10aa, 10ab, . . . ) connected to the LAN 2a are connected to the controller 50a, the terminals (10ba, 10bb, . . . ) connected to the LAN 2b are connected to the controller 50b, the terminals (10ca, 10cb, . . . ) connected to the LAN 2c are connected to the controller 50c, and the terminals (10da, 10db, . . . ) connected to the LAN 2d are connected to the controller 50d. The login request information includes a terminal ID for identifying the corresponding terminal 10aa that is the requester terminal or the user of the terminal 10aa and a password. The terminal ID and the password are pieces of data read from the storage unit 1000 via the storage/reading processing unit 19 and transmitted to the transmitter/receiver 11. The terminal ID shown in this example is merely an example of information for use in authentication, and the login request information is only required to include at least identification for identifying the terminal 10 or the user of the terminal 10 and information for identifying the controller 50 to which the terminal 10 is connected, and is not limited to this form.

Next, the authenticating unit 52 of the controller 50a requests authentication that is performed by determining whether the terminal ID and the password included in the login request information received via the transmitter/receiver 51 is managed in the terminal authentication management table (refer to FIG. 9) (Step S13). In this case, the transmitter/receiver 51 of the controller 50a transmits the terminal ID and the password included in the login request information to the management apparatus 60ab and searches the terminal authentication management table, thereby requesting to search for the password corresponding to this terminal ID. The extracting unit 64 of the management apparatus 60ab extracts the password corresponding to the terminal ID included in the login request information in the terminal authentication management table. If the extracted password and the password transmitted from the controller 50a match, the transmitter/receiver 61 of the management apparatus 60ab transmits an authentication result indicating that the terminal 10aa has a valid authority to the controller 50a. If the extracted password and the password transmitted from the controller 50a do not match, the transmitter/receiver 61 of the management apparatus 60ab transmits an authentication result indicating that the terminal 10aa do not have a valid authority to the controller 50a. The authenticating unit 52 manages the same terminal ID and password, and when determined to be a login request from the terminal 10 having the valid authority, the first changing unit 53a of the state management unit 53 stores in the terminal management table (refer to FIG. 15) the terminal ID and the operation state of the terminal 10aa in association with each other (Step S14). This causes the terminal management table to manage the terminal ID "01aa" and the state information "Online" in association with each other.

The transmitter/receiver 51 of the controller 50a transmits authentication result information indicating the authentication result obtained by the authenticating unit 52 to the terminal 10aa as the requester terminal that requested the login via the communication network 2 (Step S15). The present embodiment continues to describe below the case determined to be a terminal having a valid authority by the authenticating unit 52.

When the terminal 10 successes a login to the controller 50a or when the terminal 10 transmits various types of management information to the controller 50a after the login, the state information of the terminal 10 managed in the terminal management table of each controller 50 is changed (refer to Step S14), the controllers 50 working in the inter-node cooperation synchronize the operation states of the respective terminals 10 with the changed operation state. The following describes a case of synchronizing an operation state between the controller 50a and the controller 50b. When the operation state managed in the terminal management table (refer to FIG. 15) is changed by the first changing unit 53a based on various types of management information from the terminal 10 (the terminal 10aa in this example) connected to the controller 50a, the storage/reading processing unit 59 stores in the volatile storage unit 5100 the terminal ID "01aa" of the terminal 10aa and the operation state (Online, for example) indicating the changed state of the terminal 10aa in association with each other as local data for synchronization (Step S21a).

Next, if there is another controller 50 working in the inter-node cooperation (Step S22a), the transmitter/receiver 51 of the controller 50a transmits changed state information indicating the operation state information to the controller 50b in the inter-node cooperation (Step S23a). The operation state information includes the local data for synchronization stored in the volatile storage unit 5100, that is, the terminal ID "01aa" and the operation state "Online."

The operation state information transmitted from the controller 50a is received by the transmitter/receiver 51 of the controller 50b. The second changing unit 53b of the state management unit 53 of the controller 50b changes the operation state managed in association with the terminal ID "01aa" into "Online" based on the operation state information in the terminal management table (refer to FIG. 15) (Step S24a).

Upon completion of the change of the operation state by the second changing unit 53b, the transmitter/receiver 51 of the controller 50b transmits, to the controller 50a, change completion information indicating the completion of the change of the operation state (Step S25a). This change completion information includes the terminal ID "01aa" of the terminal 10aa and the changed operation state "Online."

In a similar manner to the processing at Step S14 and the like, when the operation state of the terminal 10 managed in the terminal management table of the controller 50b is changed by the first changing unit 53a of the controller 50b, the controller 50b and the other controller 50a working in the inter-node cooperation synchronize the operation state with the changed operation state. This processing is similar to processing at Step S21a to Step S25a, and the description thereof is omitted (Step S21b to Step S25b).

Communication Start Processing

Figure 20:
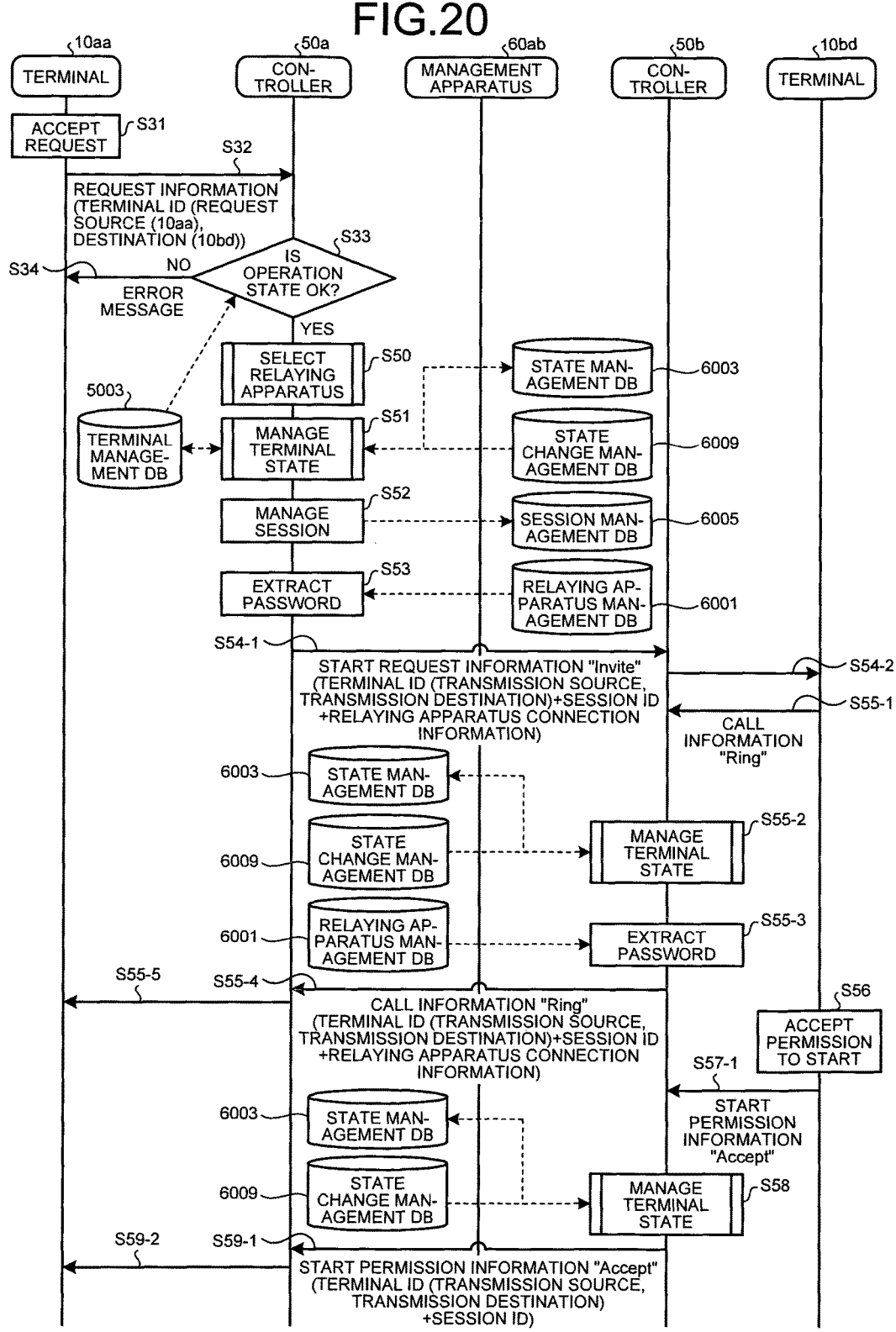
FIG. 20 is a sequence diagram illustrating processing along with the start of communication.

Next, processing related to the start of communication between the terminal 10aa and the terminal 10bd will be described with reference to FIG. 20. FIG. 20 is a sequence diagram illustrating processing related to the start of communication. In FIG. 20, various types of management information are transmitted and received entirely through the session sei for management information illustrated in FIG. 2.

First, the user of the terminal 10aa presses down the operation button 108 illustrated in FIG. 3 to select the terminal 10bd as a destination candidate, thereby causing the operation input accepting unit 12 illustrated in FIG. 6 to accept a request to start communication (Step S31). The transmitter/receiver 11 of the terminal 10aa transmits, to the controller 50a, the start request information "Invite" that includes the terminal ID "01aa" of the terminal 10aa as the requester terminal of the start of communication and the terminal ID "01bd" of the terminal 10bd as a destination and indicates request to start communication (Step S32). The transmitter/receiver 51 of the controller 50a receives the start request information, thereby accepting the request to start communication between the terminal 10aa and the terminal 10bd.

Then, the storage/reading processing unit 59 of the controller 50a refers to the operation state corresponding to the terminal ID "01bd" of the terminal 10bd in the terminal management table (refer to FIG. 15), thereby checking whether the operation state of the terminal 10bd as a destination is "Online" (Step S33). If the operation state is not "Online" (No at Step S33), the terminal 10bd as the destination is not on standby waiting for communication, and the transmitter/receiver 51 transmits an error message to the terminal 10aa as the start requester terminal (Step S34). If the operation state is "Online" (Yes at Step S33), the controller 50a continues processing to establish the session sed for content data between the terminal 10aa and the terminal 10db.

The transmitter/receiver 51 then transmits, to the selecting apparatus 80, the selection request information that includes the terminal ID "01aa" of the terminal 10aa and the terminal ID "01bd" of the terminal 10bd and indicates a request to select the relaying apparatus 30 for use in relaying content data transmitted and received between the terminal 10aa and the terminal 10bd, thereby allowing the selecting apparatus 80 to select the relaying apparatus 30 (Step S50).

The transmitter/receiver 81 of the selecting apparatus 80 receives the selection request information, thereby accepting the request to select the relaying apparatus 30. The selecting unit 82 then selects at least one relaying apparatus 30 for use in relaying the content data transmitted and received between the terminal 10aa and the terminal 10bd out of the relaying apparatuses 30 managed in the relaying apparatus selection management table (refer to FIG. 14).

In this case, the selecting unit 82 extracts, for each of the relaying apparatus IDs managed in the relaying apparatus selection management table (refer to FIG. 14), priority associated with the terminal ID "01aa" of the terminal 10aa as the requester terminal and priority associated with the terminal ID "01bd" of the terminal 10bd as the destination. The selecting unit 82 then calculates, for each of the relaying apparatus IDs, the sum of the extracted priorities and selects the relaying apparatus ID whose calculated sum of the priorities is the largest. In the present embodiment, the sum of the priorities corresponding to the relaying apparatus ID "111a" is "5," which is the largest. The selecting unit 82 selects the relaying apparatus ID managed in the relaying apparatus selection management table, thereby also extracting the domain information included in the relaying apparatus ID.

Upon completion of the selection of the relaying apparatus 30, the transmitter/receiver 81 of the selecting apparatus 80 transmits, to the controller 50a, selection result information that includes the relaying apparatus ID identifying the selected relaying apparatus, the terminal ID "01aa" of the terminal 10aa, and the terminal ID "01bd" of the terminal 10bd and indicates the result of the selection, and outputs it.

Figure 21:
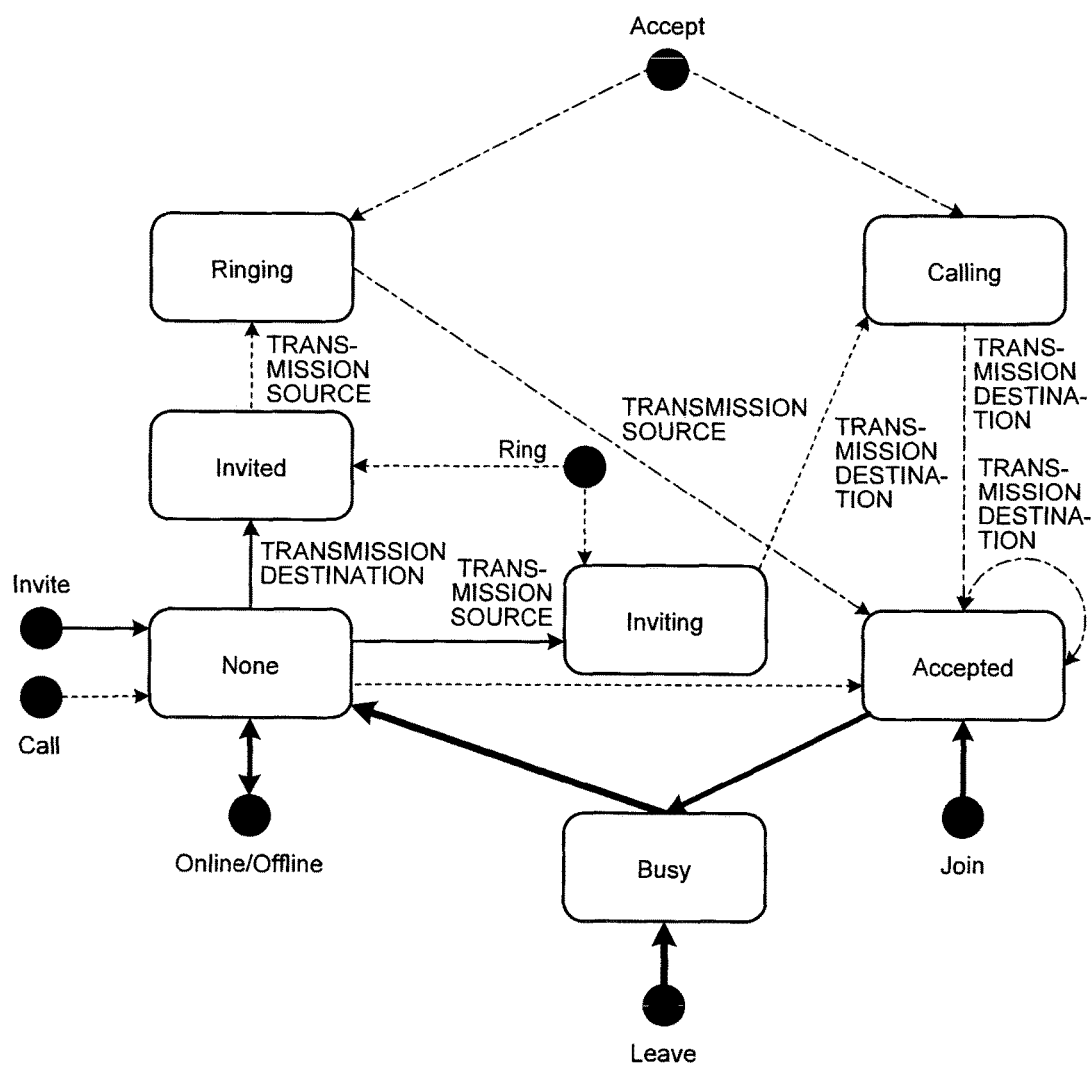
FIG. 21 is a state transition diagram illustrating transitions between states of a terminal.
Figure 22:
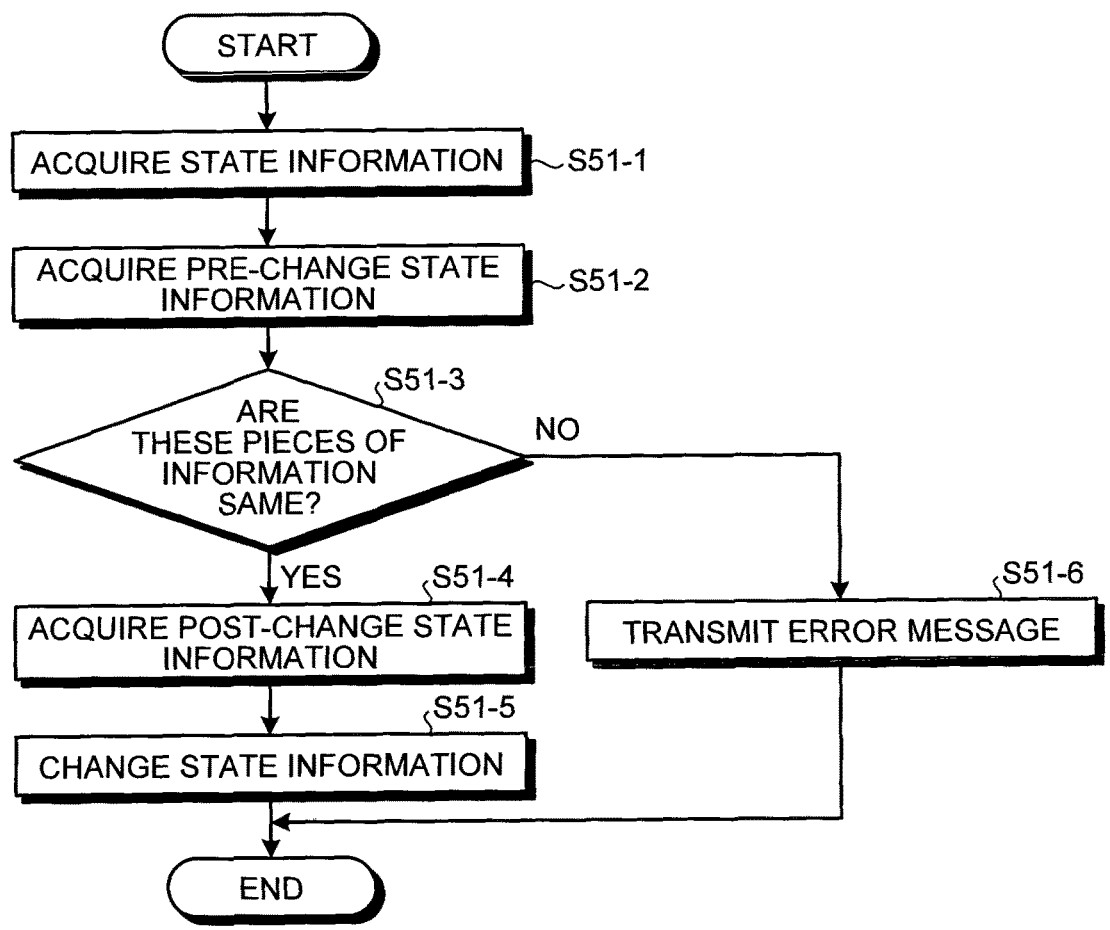
FIG. 22 is a flow diagram illustrating processing to change the state of a terminal.

Subsequently, the state management unit 53 changes the state information of the terminal 10 managed in the state management table (refer to FIG. 10) based on the start request information "Invite" transmitted from the terminal 10aa at Step S32 (Step S51). The processing at Step S51 will be described in detail with reference to FIG. 21 and FIG. 22. FIG. 21 is a state transition diagram illustrating transitions between states of a terminal. FIG. 22 is a flow diagram illustrating processing to change the state of a terminal.

In the present embodiment, the state management unit 53 changes the state of the terminal 10 in accordance with the rules about changes of the state illustrated by the state transition diagram in FIG. 21. When receiving the start request information "Invite" from the terminal 10, for example, the state information "None" of the terminal 10 is changed into the state information "Inviting" or the state information "Invited." Also when management information "Ring", "Accept", "Join", and "Leave" other than "Invite" is transmitted from the terminal 10, the state management unit 53 changes the state of the terminal 10 in accordance with the rules about changes illustrated by the state transition diagram in FIG. 21. The detailed description thereof is omitted. Although the present embodiment will describe an example using the state change management table (refer to FIGS. 13A and 13B) in order to achieve changes of the state by the state management unit 53, it is not limited to the method using the state change management table so long as a communication state can be changed in accordance with the rules illustrated in FIG. 21.

First, the state management unit 53 acquires, from the state management table, the state information "None" of the terminal 10aa as the transmission source of the start request information and the state information of the terminal 10bd as the transmission destination (refer to FIG. 10 (Step S51-1). In this case, the state management unit 53 of the controller 50a transmits the terminal ID of the terminal 10aa as the start requester terminal and the terminal ID of the terminal 10bd as the transmission destination of the start request information to the management apparatus 60ab via the transmitter/receiver 51, thereby requesting to extract corresponding passwords. The extracting unit 64 of the management apparatus 60ab extracts, from the state management table, the pieces of state information corresponding to the respective terminal IDs. The extracted passwords are transmitted to the controller 50a via the transmitter/receiver 61.

Next, the state management unit 53 acquires the pre-change state information "None" of the terminal 10 as the transmission source and the transmission destination corresponding to the start request information "Invite" as management information from the state change management table (refer to FIG. 13B) (Step S51-2). In this case, the state management unit 53 of the controller 50a transmits the start request information "Invite" to the management apparatus 60*ab* via the transmitter/receiver 51 and searches the state change management table, thereby requesting to search for the pre-change state information corresponding to this start request information. The extracting unit 64 of the management apparatus 60*ab* extracts the pre-change state information corresponding to the start request information in the state change management table. The extracted pre-change state information is transmitted to the controller 50*a* via the transmitter/receiver 61. Next, the state management unit 53, for the terminal 10*aa* as the transmission source and the terminal 10*bd* as the transmission destination separately, compares the state information acquired from the terminal management table and the pre-change state information acquired from the state change management table (refer to FIGS. 13A and 13B) and determines whether these are the same (Step S51-3).

If it is determined that these pieces of information are the same (Yes at Step S51-3), the state management unit 53 acquires the post-change state information "Inviting" of the transmission source and the post-change state information "Invited" of the transmission destination of the change request information "Invite" from the state change management table (Step S51-4). In this case, the state management unit 53 of the controller 50*a* transmits the start request information "Invite" to the management apparatus 60*ab* via the transmitter/receiver 51 and searches the state change management table, thereby requesting to search for the post-change state information corresponding to this start request,information. The extracting unit 64 of the management apparatus 60*ab* extracts the post-change state information corresponding to the start request information in the state change management table. The extracted post-change state information is transmitted to the controller 50*a* via the transmitter/receiver 61.

Next, the first changing unit 53*a* of the state management unit 53 changes the state information associated with the terminal ID "01aa" of the terminal 10*aa* as the transmission source into "Inviting" based on the acquired post-change state information in the state management table (refer to FIG. 10) (Step S51-5). Similarly, the first changing unit 53*a* of the state management unit 53 changes, in the state management table, the state information associated with the terminal ID "01bd" of the terminal 10*bd* as the transmission destination into "Invited" based on the acquired post-change state information. In this case, the state management unit 53 of the controller 50*a* transmits, to the management apparatus 60*ab* via the transmitter/receiver 51, the terminal IDs of the terminals (10*aa*, 10*bd*) as the start requester terminal and the transmission destination of the start request information and the pieces of post-change state information of the respective terminals, thereby requesting to manage the pieces of state information. The storage/reading processing unit 69 of the management apparatus 60*ab* changes the pieces of state information corresponding to the respective terminal IDs based on the received pieces of state information, thereby updating the state management table.

After the pieces of state information of the respective terminals (10*aa*, 10*bd*) are changed by the first changing unit 53*a* of the controller 50*a*, the first changing unit 53*a* changes the operation states of the respective terminals (10*aa*, 10*bd*) managed in the terminal management table from "Online" into "Online (in conference)". The post-change operation states are synchronized between the controller 50*a* and the controller 50*b* based on the processing at Step S21*a* to Step S25*a*.

If it is determined that the pieces of information are not the same at Step S51-3, it is considered that any terminal 10 is not in a state that can start communication, and the state management unit 53 does not perform the processing to change the states of the respective terminals 10. In this case, the transmitter/receiver 51 transmits an error message to the terminal 10*aa* (Step S51-6) and completes the processing.

Upon completion of the processing to change the state information of the terminal 10, the session management unit 57 generates the session ID "se01@jp.oo.com" for identifying the session sed for content data for performing communication between the terminal 10*aa* and the terminal 10*bd* (Step S52). The session management unit 57 records the generated session ID, the relaying apparatus ID "111a" of the selected relaying apparatus 30*a*, and the terminal IDs "01aa" and "01bd" of the respective terminals (10*aa*, 10*bd*) that start communication in association with each other in the session management table (refer to FIGS. 12A and 12B). In this case, the session management unit 57 of the controller 50*a* transmits the above session ID, relaying apparatus ID, and terminal IDs to the management apparatus 60*ab* via the transmitter/receiver 51, thereby requesting to record these pieces of information in the session management table. The storage/reading processing unit 69 of the management apparatus 60*ab* records the generated session ID, the relaying apparatus ID "111a" of the selected relaying apparatus 30*a*, and the terminal IDs "01aa" and "01bd" of the respective terminals (10*aa*, 10*bd*) that start communication in association with each other in the session management table.

The session management unit 57 searches the relaying apparatus management table (FIGS. 8A and 8B) with the relaying apparatus ID "111a" of the selected relaying apparatus 30*a* as a key, thereby extracting the corresponding password "xxxx" (Step S53). In this case, the session management unit 57 of the controller 50*a* transmits the above session ID and relaying apparatus ID to the management apparatus 60*ab* via the transmitter/receiver 51, thereby requesting to provide notification of the corresponding password. The extracting unit 64 of the management apparatus 60*ab* extracts the password corresponding to the relaying apparatus ID from the relaying apparatus management table. The extracted password is transmitted to the controller 50*a* via the transmitter/receiver 61.

Next, the transmitter/receiver 51 of the controller 50*a* transmits the start request information "Invite" transmitted from the terminal 10*aa* at Step S32 and the session ID "se01" to the terminal 10*bd* via the controller 50*b* (Steps S54-1, S54-2). The terminal ID of the terminal 10*bd* as the transmission destination of the start request information includes the domain information "jp2.oo.com," and the transmitter/receiver 51 can transmit the start request information via the controller 50*b* based on this domain information. The start request information includes the terminal ID "01aa" of the terminal 10*aa* as the transmission source of the start request information and the terminal ID "01bd" of the terminal 10*bd* as the transmission destination. Along with this, the transmitter/receiver 51 of the controller 50*a* transmits the relaying apparatus connection information for connecting to the selected relaying apparatus 30*a* to the terminal 10*bd* via the controller 50*b*. The relaying apparatus connection information includes the relaying apparatus ID "111a" of the relaying apparatus 30*a* and the password "xxxx" for connecting to the relaying apparatus 30*a*.

The transmitter/receiver 11 of the terminal 10*bd* receives the start request information, thereby accepting the request to start communication from the terminal 10*aa*. Upon receiving the start request information, the transmitter/receiver 11 of the terminal 10*bd* transmits call information "Ring" that indicates acceptance of the request to start communication and is for sounding a dial tone at the terminal 10*aa* to the controller 50*b* (Step S55-1). The call information includes the terminal ID "01bd" of the terminal 10*bd* as the transmission source of the call information, the terminal ID "01aa" of the terminal 10*aa* as the transmission destination, and the session ID "se01@jp.oo.com."

The call information transmitted at Step S55-1 is received by the transmitter/receiver 51 of the controller 50*b*. This causes the transmitter/receiver 51 of the controller 50*b* to accept a request to sound a dial tone at the terminal 10*aa*.

The first changing unit 53*a* of the state management unit 53 of the controller 50*b* changes the state information of the terminal 10*aa* managed in the state management table (refer to FIG. 10) into "Calling" and changes the state information of the terminal 10*bd* into "Ringing" based on the call information "Ring" transmitted from the terminal 10*bd* (Step S55-2). Processing to change the pieces of state information of the terminals (10*aa*, 10*bd*) is similar to the processing at Steps S51-1 to S51-6, and the detailed description thereof is omitted.

In a similar manner to Step S53, the session management unit 57 searches the relaying apparatus management table (FIGS. 8A and 8B) with the relaying apparatus ID "111a" of the selected relaying apparatus 30*a* as a key, thereby extracting the corresponding password "xxxx" (Step S55-3).

The transmitter/receiver 51 of the controller 50*b* transmits the call information "Ring" transmitted from the terminal 10*bd* at Step S55-1 via the controller 50*a* to the terminal 10*aa* (Steps S55-4, S55-5). The terminal ID of the terminal 10*aa* as the transmission destination of the start request information includes the domain information "jp1.oo.com," and the transmitter/receiver 51 can transmit the call information via the controller 50*a* based on this domain information. This call information includes the terminal ID "01bd" of the terminal 10*bd* as the transmission source of the call information, the terminal ID "01aa" of the terminal 10*aa* as the transmission destination, and the session ID. Along with this, the transmitter/receiver 51 of the controller 50*b* transmits the relaying apparatus connection information for connecting to the relaying apparatus 30*a* to the terminal 10*aa*. The relaying apparatus connection information includes the relaying apparatus ID "111*a*" of the relaying apparatus 30*a* and the password "xxxx" for connecting to the relaying apparatus 30*a*.

The transmitter/receiver 11 of the terminal 10*aa* receives the above call information, thereby accepting a request to sound a ring tone at the terminal 10*aa*. This enables the voice output unit 15*b* of the terminal 10*aa* to sound a dial tone from the speaker 115.

In the terminal 10*bd*, the voice output unit 15*b* sounds a ring tone from the speaker 115. This enables the user of the terminal 10*bd* to know the request to start communication from the terminal 10*aa*. At the same time, the operation button 108 of the terminal 10*bd* accepts permission to start communication with the terminal 10*aa* (Step S56). Upon acceptance of the permission to start communication, start permission information "Accept" indicating permission to start communication is transmitted to the controller 50*b* (Step S57-1). This start permission information includes the terminal ID "01bd" of the terminal 10*bd* as the transmission source of the start permission information, the terminal ID "01aa" of the terminal 10*aa* as the transmission destination, and the session ID "se01@jp.oo.com." This causes the transmitter/receiver 51 of the controller 50*b* to accept a response to the permission to start by the terminal 10*bd*.

The, the first changing unit 53*a* of the state management unit 53 of the controller 50*b* changes the state information of the terminal 10*aa* and the state information of the terminal 10*bd* managed in the state management table (refer to FIG. 10) into "Accepted" based on the start permission information "Accept" transmitted from the terminal 10*bd* (Step S58). Processing to change the pieces of state information of the terminals 10 is similar to the processing at Steps S51-1 to S51-6, and the detailed description thereof is omitted.

The controller 50*b* then transmits the start permission information "Accept" transmitted from the terminal 10*bd* at Step S57-1 to the terminal 10*aa* via the controller 50*a* (Steps S59-1, S59-2). The terminal ID of the terminal 10*aa* as the transmission destination of the start permission information includes the domain information "jp1.oo.com," and the transmitter/receiver 51 can transmit the call information via the controller 50*a* based on this domain information. This start permission information includes the terminal ID "01bd" of the terminal 10*bd* as the transmission source of the start permission information, the terminal ID "01aa" of the terminal 10*aa* as the transmission destination, and the session ID.

Figure 23:
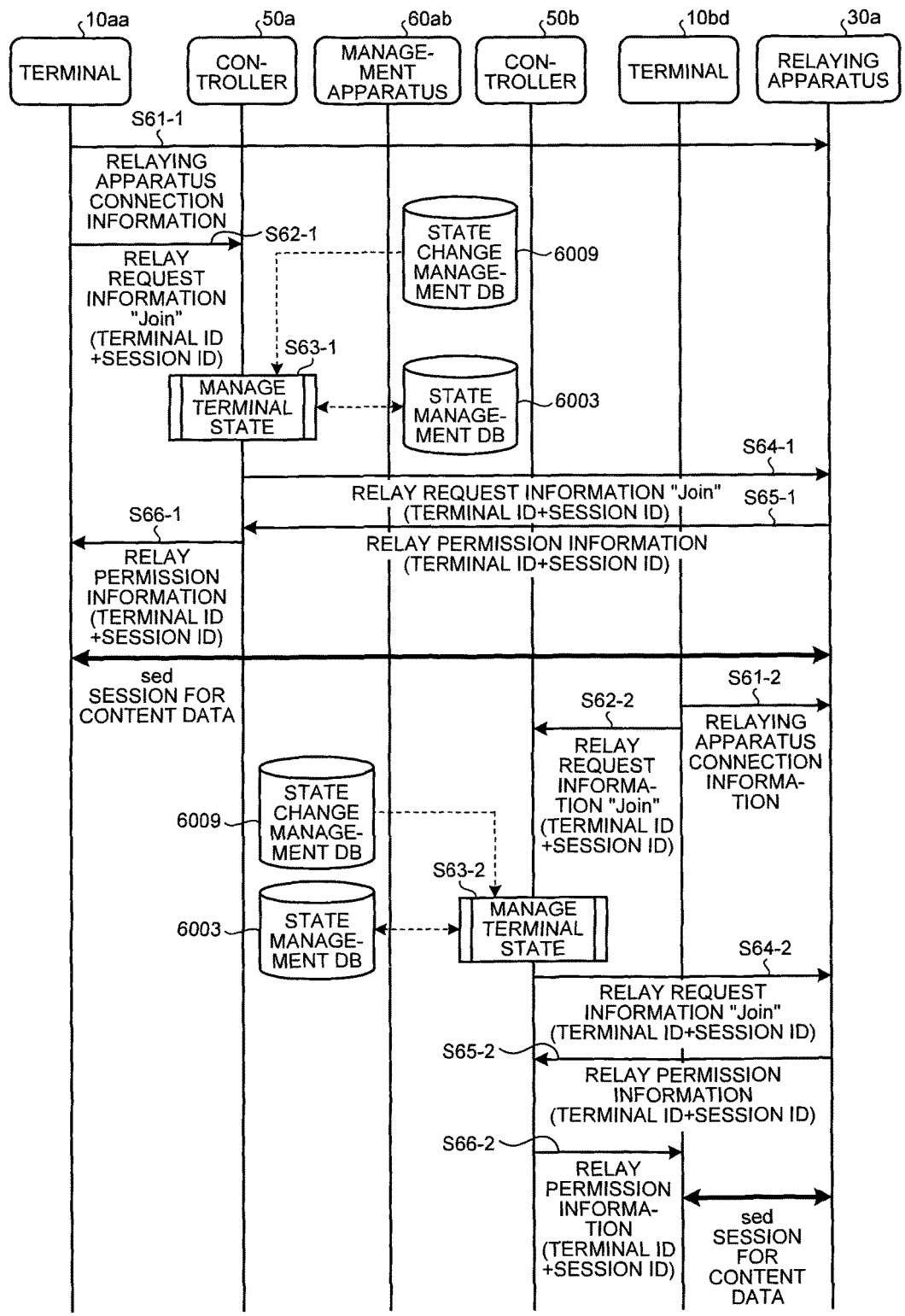
FIG. 23 is a sequence diagram illustrating processing to start communication between terminals.

The following describes processing to start the session sed for content data between the terminals (10*aa*, 10*bd*) after the request to start communication is permitted with reference to FIG. 23. FIG. 23 is a sequence diagram illustrating processing to start communication between the terminals 10. In the communication between the terminal 10 and the controller 50 in FIG. 23, various types of management information are transmitted and received through the session sei for management information illustrated in FIG. 2.

First, the terminal 10*aa* connects to the relaying apparatus 30*a* based on the relaying apparatus connection information received at Step S55-5 (Step S61-1). The transmitter/receiver 11 of the terminal 10*aa* then transmits relay request information "Join" indicating a request to start relaying to the controller 50*a* (Step S62-1). This relay request information includes the terminal ID "01aa" of the terminal 10*aa* and the session ID "se01@jp.oo.com." This causes the transmitter/receiver 51 of the controller 50*a* to accept the request to start relaying by the terminal 10*aa*.

Then, the first changing unit 53*a* of the state management unit 53 of the controller 50*a* changes the state information of the terminal 10*aa* managed in the state management table (FIG. 10) into "Busy" based on the relay request information "Join" transmitted from the terminal 10*aa* (Step S63-1). Processing to change the state information of the terminal 10 is similar to the processing at Steps S51-1 to S51-6, and the detailed description thereof is omitted.

The transmitter/receiver 51 of the controller 50*a* transmits the relay request information including the terminal ID "01aa" of the terminal 10*aa* and the session ID "se01" to the relaying apparatus 30*a* (Step S64-1). Upon acceptance of this relay request information, the transmitter/receiver 31 of the relaying apparatus 30*a* transmits relay permission information that includes the terminal ID "01aa" of the terminal 10*aa* and the session ID "se01" and indicates permission to start relaying to the controller 50*a* (Step S65-1). The transmitter/receiver 51 of the controller 50*a* transmits the received relay permission information to the terminal 10*aa* (Step S66-1). This establishes the session sed for content data between the terminal 10*aa* and the relaying apparatus 30*a*.

The terminal 10*bd* connects to the relaying apparatus 30*a* based on the relaying apparatus connection information received at Step S56 (Step S61-2). The transmitter/receiver 11 of the terminal 10*bd* then transmits the relay request information "Join" indicating a request to start relaying to the controller 50*b* (Step S62-2). This relay request information includes the terminal ID "01bd" of the terminal 10*bd* and the session ID "se01@jp.oo.com." This causes the transmitter/receiver 51 of the controller 50*b* to accept the request to start relaying by the terminal 10*bd*.

The first changing unit 53*a* of the state management unit 53 of the controller 50*b* changes the state information of the terminal 10*bd* managed in the state management table (see FIG. 10) into "Busy" based on the relay request information "Join" transmitted from the terminal 10*bd* (Step S63-2). Processing to change the state information of the terminal 10 is similar to the processing at Steps S51-1 to S51-6, and the detailed description thereof is omitted.

The transmitter/receiver 51 of the controller 50*b* then transmits the relay request information including the terminal ID "01bd" of the terminal 10*bd* and the session ID "se01" to the relaying apparatus 30*a* (Step S64-2). Upon acceptance of this relay request information, the relaying apparatus 30*a* transmits relay permission information that includes the terminal ID "01bd" of the terminal 10*bd* and the session ID "se01" and indicates permission to start relaying to the controller 50*b* (Step S65-2). The transmitter/receiver 51 of the controller 50*b* transmits the received relay permission information to the terminal 10*bd* (Step S66-2). This establishes the session sed for content data between the terminal 10*bd* and the relaying apparatus 30*a*. Upon establishment of the respective sessions sed for content data, the relaying apparatus 30*a* relays the content data including image data and voice data transmitted from one of the terminals (10*aa*, 10*bd*) to the other, thereby starting a teleconference.

Participation

Figure 24:
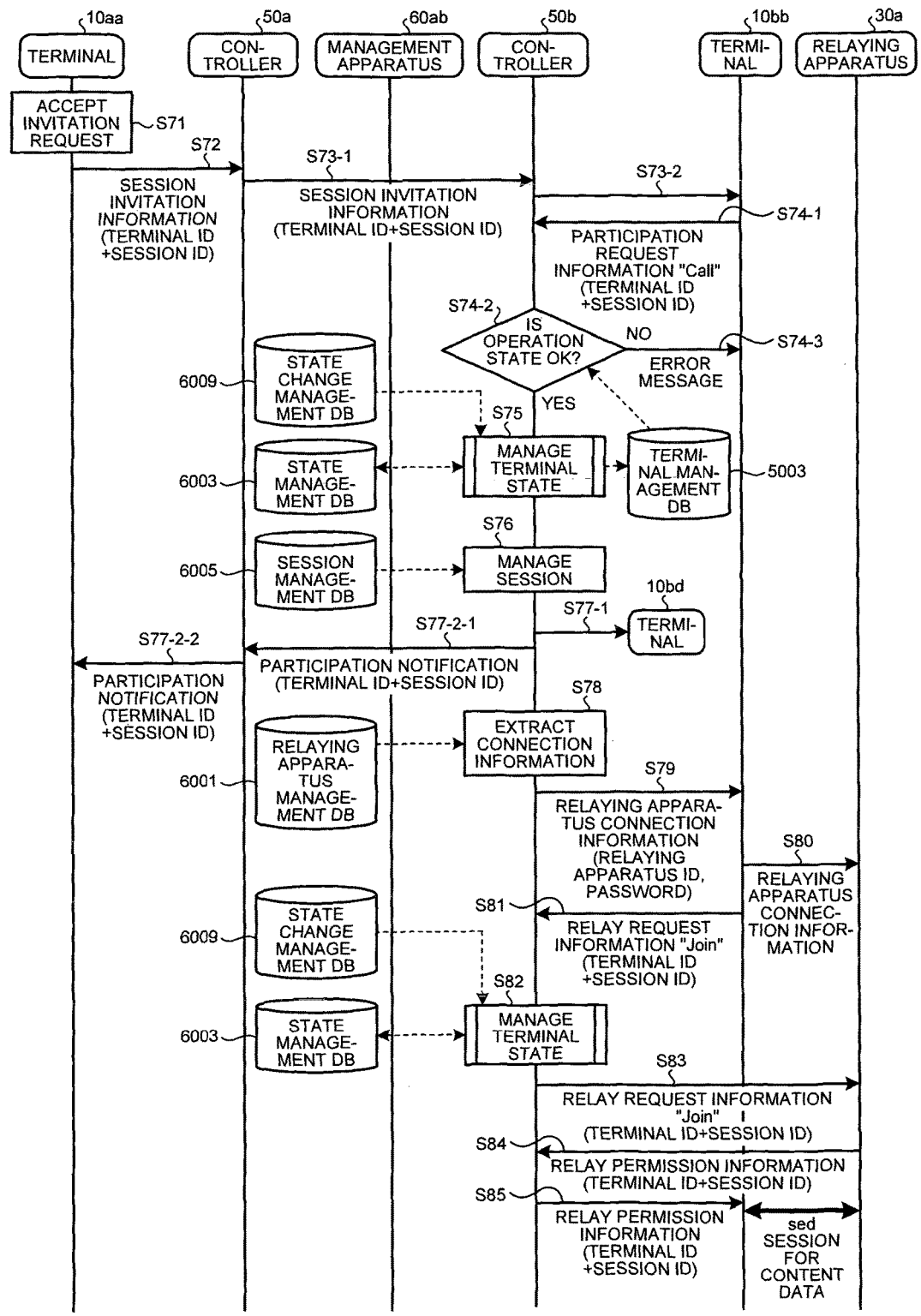
FIG. 24 is a sequence diagram illustrating processing to start communication among three terminals.

The following describes processing to start communication among three terminals 10 through the participation of the terminal 10*bb* in the session sed for content data after the session sed for content data has been established between the terminal 10*aa* and the terminal 10*bd* with reference to FIG. 24. FIG. 24 is a sequence diagram illustrating processing to start communication among the three terminals. In the communication between the terminal 10 and the controller 50 in FIG. 24, various types of management information are transmitted and received through the session sei for management information.

First, the user of the terminal 10*aa* that is performing communication with the terminal 10*bd* presses down the operation button 108 illustrated in FIG. 3, thereby causing the operation input accepting unit 12 to accept a request to invite the terminal 10*bb* to the session in communication (Step S71). Next, the transmitter/receiver 11 of the terminal 10*aa* transmits session invitation information that includes the terminal ID "01*aa*" of the terminal 10*aa*, the terminal ID "01bb" of the terminal 10*bb*, and the session ID "se01" and indicates invitation to the session in communication to the controller 50*a* (Step S72). The session ID may be identification such as conference ID, communication ID, and call ID identifying events such as a conference, communication, a call corresponding to the session sed for content data. The transmitter/receiver 51 of the controller 50*a* transmits the received session invitation information to the terminal 10*bb* via the controller 50*b* (Steps S73-1, S73-2). The terminal ID of the terminal 10*bb* as the transmission destination of the session invitation information includes the domain information "jp2.oo.com," and the transmitter/receiver 51 can transmit the session invitation information via the controller 50*b* based on this domain information.

In response to this invitation, the transmitter/receiver 11 of the terminal 10*bb* transmits participation request information "Call" indicating a request to participate in this session to the controller 50*b* (Step S74-1). This participation request information includes the terminal ID "01bb" of the terminal 10*bb* that requests to participate in this session and the session ID "se01@jp.oo.com." This causes the transmitter/receiver 51 of the controller 50*b* to accept the request to participate in the session sed for content data from the terminal 10*bb*.

The storage/reading processing unit 59 of the controller 50*b* refers to the operation state corresponding to the terminal IDs "01aa, 01bd" of the terminal 10*bd* in the terminal management table (refer to FIG. 15), thereby checking whether the operation states of the terminals (10*aa*, 10*bd*) that are performing the session sed for content data are "Online (in conference)" (Step S74-2). If both the operation states of the terminals (10*aa*, 10*bd*) are not "Online (in conference)" (No at Step S74-2), the terminal 10*bd* as the destination cannot participate in the session sed for content data, and the transmitter/receiver 51 transmits an error message to the terminal 10*bb* as a participation request source (Step S74-3). If the operation states are "Online (in conference)" (Yes at Step S74-2), the controller 50*b* continues the processing to establish the session sed for content data between the terminal 10*bb* and the terminals (10*aa*, 10*bd*).

The first changing unit 53*a* of the state management unit 53 of the controller 50*b* then changes the state information of the terminal 10*bb* managed in the state management table (see FIG. 10) into "Accepted" based on the participation request information "Call" transmitted from the terminal 10*bb* (Step S75). Processing to change the state information of the terminal 10 is similar to the pieces of processing at Steps S51-1 to S51-6, and the detailed description thereof is omitted.

After the state information of the terminal 10*bb* is changed by the first changing unit 53*a* of the controller 50*a*, the first changing unit 53*a* changes the operation state of each terminal 10*bb* managed in the terminal management table from "Online" into "Online (in conference)." The changed operation state is synchronized between the controller 50*a* and the controller 50*b* based on the processing at Step S21*b* to Step S24*b*.

The session management unit 57 of the controller 50*b* adds the terminal ID "01bb" of the terminal 10*bb* that requests participation in a destination terminal field of a record including the session ID "se01" in the session management table (refer to FIGS. 12A and 12B) (Step S76). In this case, the session management unit 57 of the controller 50*b* transmits the above session ID and terminal ID to the management apparatus 60*ab* via the transmitter/receiver 51, thereby requesting to record these pieces of information in the session management table. The storage/reading processing unit 69 of the management apparatus 60*ab* records the terminal ID "01bb" in the session management table in association with the destination terminal field of the record including the session ID "se01".

The transmitter/receiver 51 of the controller 50*b* transmits participation notification including the terminal ID "01bb" of the terminal 10*bb* participating in the session sed for content data and the session ID "se01" to the terminal 10*aa* and the terminal 10*bd* that are performing communication in this session (Steps S77-1, S77-2-1, 577-2-2). This enables the terminal 10*aa* and the terminal 10*bd* to grasp the participation of the terminal 10*bb* in the session sed for content data.

The session management unit 57 searches the relaying apparatus management table (FIGS. 8A and 8B) with the relaying apparatus ID "111a" of the selected relaying apparatus 30a as a key, thereby extracting the corresponding password "xxxx" (Step S78). In this case, the session management unit 57 of the controller 50b transmits the above session ID and relaying apparatus ID to the management apparatus 60ab via the transmitter/receiver 51, thereby requesting to provide notification of the corresponding password for connecting to the relaying apparatus 30a. The extracting unit 64 of the management apparatus 60ab extracts the password corresponding to the relaying apparatus ID from the relaying apparatus management table. The extracted password is transmitted to the controller 50b by the transmitter/receiver 61.

The transmitter/receiver 51 of the controller 50b transmits the relaying apparatus connection information for connecting to the relaying apparatus 30a that relays the content data in this session to the terminal 10bb. The relaying apparatus connection information includes the relaying apparatus ID "111a" of the relaying apparatus 30a and the password "xxxx" for connecting to the relaying apparatus 30a managed in the relaying apparatus management table (refer to FIG. 8A) (Step S79).

Then, by performing the processing similar to Steps S61-2 to S66-2, the session sed for content data between the terminal 10bb and the relaying apparatus 30a is established (Steps S80 to S85). Upon establishment of this session, the relaying apparatus 30a can relay the content data among the terminals (10aa, 10bb, 10bd). This enables the terminals (10aa, 10bb, 10bd) to start a teleconference.

End

Figure 25:
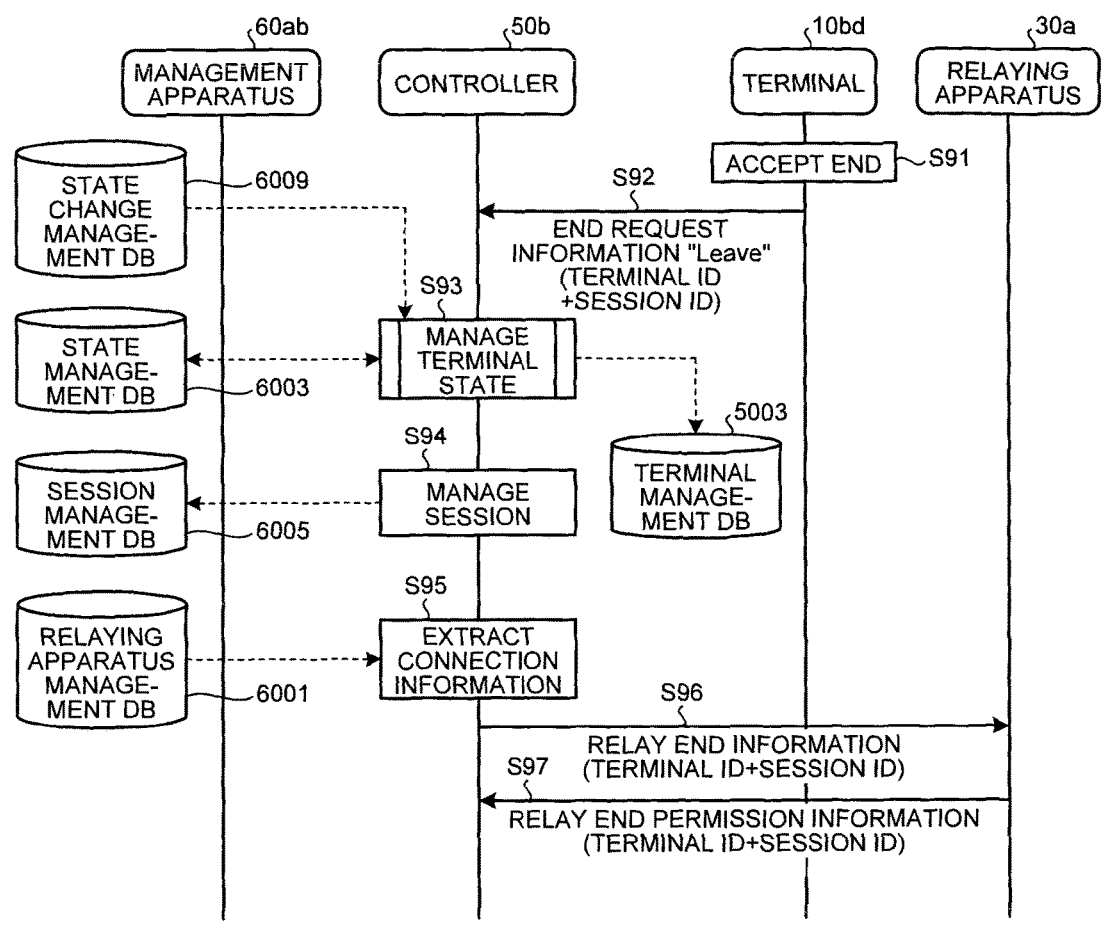
FIG. 25 is a sequence diagram illustrating processing to end communication.

The following describes processing in which, after the session sed for content data has been established among the terminals (10aa, 10bb, 10bd), the terminal 10bd leaves the session sed for content data to end communication with reference to FIG. 25. FIG. 25 is sequence diagram illustrating processing to end communication. FIG. 25 illustrates processing to transmit and receive various types of management information through the session sei for management information.

First, the user of the terminal 10bd presses down the operation button 108 illustrated in FIG. 4, thereby accepting a request to end communication (Step S91). The transmitter/receiver 11 of the terminal 10bd transmits end request information "Leave" including the terminal ID "01bd" of the terminal 10bd and the session ID "se01@jp.oo.com" identifying the session sed for content data used in this communication to the controller 50b via the controller 50b (Step S92). This causes the transmitter/receiver 51 of the controller 50b to accept the request to end communication from the terminal 10bd.

The first changing unit of the state management unit 53 of the controller 50b changes the state information of the terminal 10bd managed in the state management table (see FIG. 10) into "None" based on the participation request information "Leave" transmitted from the terminal 10bd (Step S93). Processing to change the state information of the terminal 10 is similar to the processing at Steps S51-1 to S51-6, and the detailed description thereof is omitted.

After the state information of the terminal 10bd is changed by the first changing unit of the controller 50b, the first changing unit 53a changes the operation state of the terminal 10bd managed in the terminal management table from "Online (in conference)" into "Online." The changed operation state is synchronized between the controller 50b and the controller 50a based on the processing at Step S21b to Step S25b.

The session management unit 57 deletes the terminal ID "01bd" of the terminal 10bd from the terminal ID field of the record including the session ID "se01" in the session management table (refer to FIGS. 12A and 12B) (Step S94). In this case, the session management unit 57 of the controller 50b transmits the above session ID and terminal ID to the management apparatus 60ab via the transmitter/receiver 51, thereby requesting to delete the terminal ID managed in the session management table. The storage/reading processing unit 69 of the management apparatus 60ab deletes the terminal ID "01bd" from the destination terminal field of the record including the session ID "se01" in the session management table.

The session management unit 57 searches the relaying apparatus management table (FIGS. 8A and 8B) with the relaying apparatus ID "111a" of the selected relaying apparatus 30a as a key, thereby extracting the corresponding password "xxxx" (Step S95). In this case, the session management unit 57 of the controller 50b transmits the above session ID and relaying apparatus ID to the management apparatus 60ab via the transmitter/receiver 51, thereby providing notification of the corresponding password. The extracting unit 64 of the management apparatus 60ab extracts the password corresponding to the relaying apparatus ID from the relaying apparatus management table, and the transmitter/receiver 61 transmits the extracted password to the controller 50b.

The transmitter/receiver 51 transmits relay end information to end relaying including the terminal ID "01bd" of the terminal 10bd and the session ID "se01" to the relaying apparatus 30a (Step S96). The relaying apparatus 30a then transmits relay end permission information that includes the terminal ID "01bd" and the session ID "se01" and permits to end relaying to the controller 50b (Step S97). This causes the relaying apparatus 30a to stop the relay of the content data transmitted from the terminal 10bd to the terminals (10aa, 10bb) and the relay of the content data transmitted from the terminals (10aa, 10bb) to the terminal 10bd (Step S96). This causes the terminal 10bd to end the communication with the terminals (10aa, 10bd) and to leave the session sed for content data.

Disconnection

Figure 26:
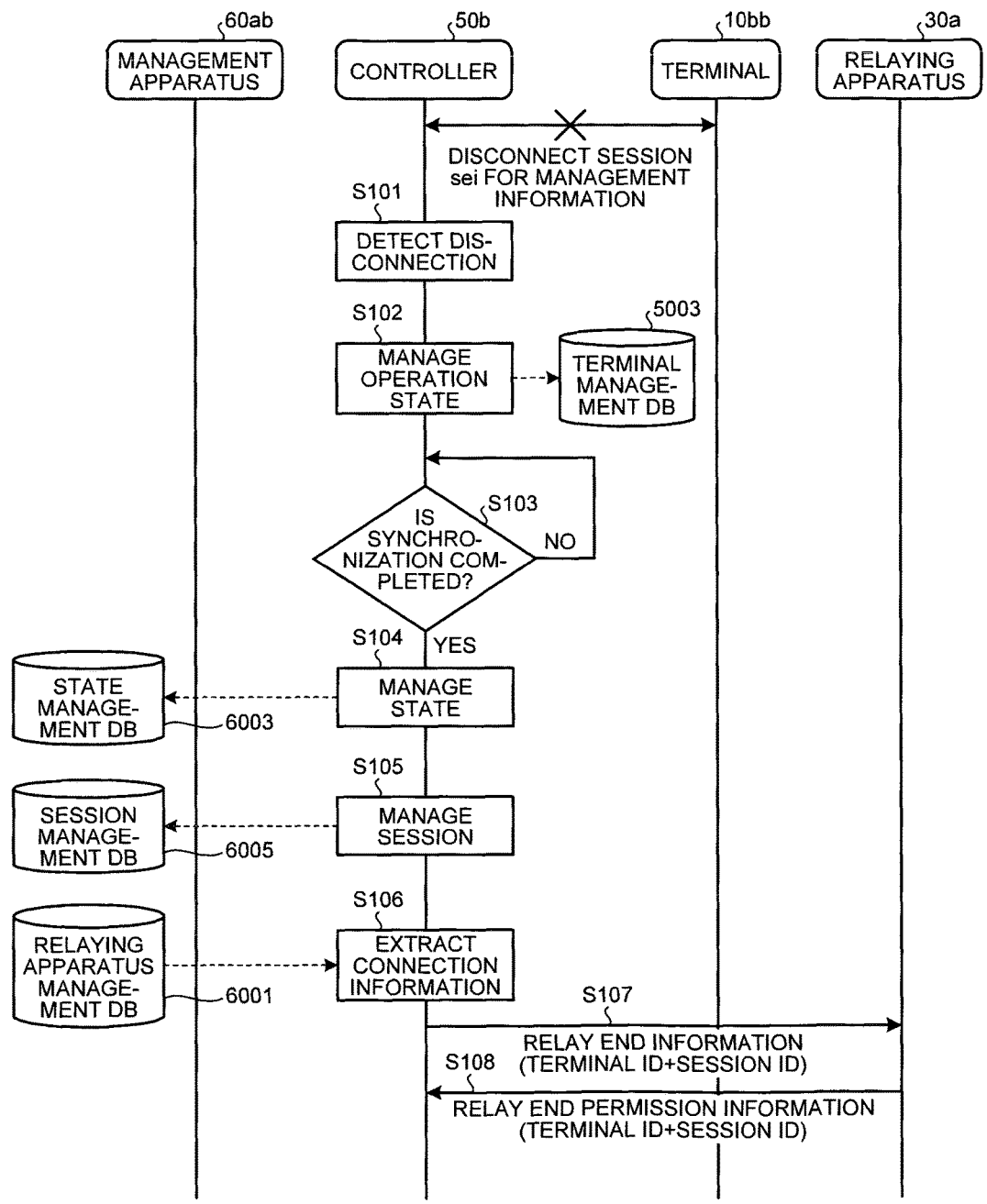
FIG. 26 is a sequence diagram illustrating processing along with the end of communication.

The following describes processing when the session sei for management information between the terminal 10bb and the controller 50 is unintentionally disconnected for some reasons such as a network failure while the session sed for content data is established between the terminals (10aa, 10bb) with reference to FIG. 26. FIG. 26 is a sequence diagram illustrating processing to end communication. FIG. 26 illustrates processing in which various types of management information are transmitted and received by the session sei for management information.

The detector 55 of the controller 50b detects the disconnection of the session sei for management information between the controller 50b and the respective terminals 10. Examples of the method for detecting the disconnection of the session sei for management information may include, but not limited to, a method that checks, when certain information is transmitted to the terminal 10, the presence or absence of a response to the information. When the detector 55 detects the disconnection of the session for management information between the controller 50b and the terminal 10bb (Step S101), the first changing unit 53a changes the operation state of the terminal 10bb managed in the terminal management table (refer to FIG. 15) from "Online (in conference)" into "Offline" and synchronizes the changed operation state between the controller 50*b* and the controller 50*a* based on the processing at Steps S21*b* to S25*b* (Step S102). If the transmitter/receiver 51 of the controller 50*b* receives the change completion information (refer to Step S25*b*), thereby checking the completion of the synchronization of the operation state (Yes at Step S103), the first changing unit 53*a* of the controller 50*b* changes the state information of the terminal 10*bb* managed in the state management table (refer to FIG. 10) into "None" (Step S104). In this case, the transmitter/receiver 51 of the controller 50*b* transmits the terminal ID "01bb" of the terminal 10*bb* and the state information "None" to the management apparatus 60*ab*. The storage/reading processing unit 69 of the management apparatus 60*ab* changes the state information of the terminal 10*bb* managed in the state management table into "None" based on the terminal ID and the state information transmitted from the controller 50*b*.

The session management unit 57 deletes the terminal ID "01bb" of the terminal 10*bd* from the terminal ID field of the record including the session ID "se01" in the session management table (refer to FIG. 12) (Step S105). In this case, the session management unit 57 of the controller 50*b* transmits the above session ID and terminal ID to the management apparatus 60*ab* via the transmitter/receiver 51, thereby requesting to delete the terminal ID managed by the session management table. The storage/reading processing unit 69 of the management apparatus 60*ab* deletes the terminal ID "01bb" from the destination terminal field of the record including the session ID "se01" in the session management table.

The session management unit 57 searches the relaying apparatus management table (FIG. 8) with the relaying apparatus ID "111a" of the selected relaying apparatus 30*a* as a key, thereby extracting the corresponding password "xxxx" (Step S106). In this case, the session management unit 57 of the controller 50*b* transmits the above session ID and relaying apparatus ID to the management apparatus 60*ab* via the transmitter/receiver 51, thereby requesting the notification of the corresponding password. The extracting unit 64 of the management apparatus 60*ab* extracts the password corresponding to the relaying apparatus ID from the relaying apparatus management table, and the transmitter/receiver 61 transmits the extracted password to the controller 50*b*.

The transmitter/receiver 51 transmits relay end information to end relaying including the terminal ID "01*bb*" of the terminal 10*bb* and the session ID "se01" to the relaying apparatus 30*a* (Step S107). The relaying apparatus 30*a* then transmits relay end permission information that includes the terminal ID "01bb" and the session ID "se01" and permits to end relaying to the controller 50*b* (Step S108). This processing causes the relaying apparatus 30*a* to stop the relay of the content data transmitted from the terminal 10*bb* to the terminal 10*aa* and the relay of the content data transmitted from the terminal 10*aa* to the terminal 10*bb* (Step S108). This processing causes the terminal 10*bb* to end the communication with the terminal 10*aa* and to leave the session sed for content data.

Supplemental

The controller 50, the management apparatus 60, the selecting apparatus 80, and the program providing system 90 of the above embodiment may be constructed by a single computer and may be constructed by a plurality of computers to which divided components (functions or means) are arbitrarily assigned. When the program providing system 90 is constructed by a single computer, the program to be transmitted by the program providing system 90 may be transmitted after being divided into a plurality of modules and may be transmitted without being divided. When the program providing system 90 is constructed by a plurality of computers, a plurality of modules may be transmitted from the respective computers in a divided manner.

Recording media storing therein the program for a management apparatus, the program for a control apparatus, the program for a selecting apparatus, the program for terminals, and the program for relaying apparatuses, the HD 204 storing therein these programs, and the program providing system 90 including the HD 204 are all used when they are provided to domestic or overseas users or the like of the above program for terminals, program for relaying apparatuses, and program for communication management as program products.

The above embodiment may manage the fully qualified domain names (FQDN) of the respective pieces of domain information. In this case, IP addresses corresponding to the FQDNs are acquired by a known domain name system (DNS) server. The ID such as the terminal ID and the relaying apparatus ID may be denoted as, for example, "relaying apparatus connection destination information indicating the connection destination to the relaying apparatus 30 on the communication network 2," "relaying apparatus destination information indicating the destination to the relaying apparatus 30 on the communication network 2," "terminal connection destination information indicating the connection destination to the terminal 10 on the communication network 2," or "terminal destination information indicating the destination to the terminal 10 on the communication network 2."

In the present embodiment, the "teleconference" is used as a term replaceable with a "videoconference." Although the above embodiment describes the teleconference system as an example of the communication system 1, it is not limiting and may be a telephone system such as Internet Protocol (IP) telephone and Internet telephone. The communication system 1 may be a car navigation system. In this case, for example, one terminal 10 corresponds to a car navigation apparatus installed in a car, whereas another terminal 10 corresponds to a management terminal or a management server of a management center managing the car navigation or a car navigation apparatus installed in another car. The communication system 1 may also be a voice conference system or a personal computer (PC) screen sharing system.

Figure 27:
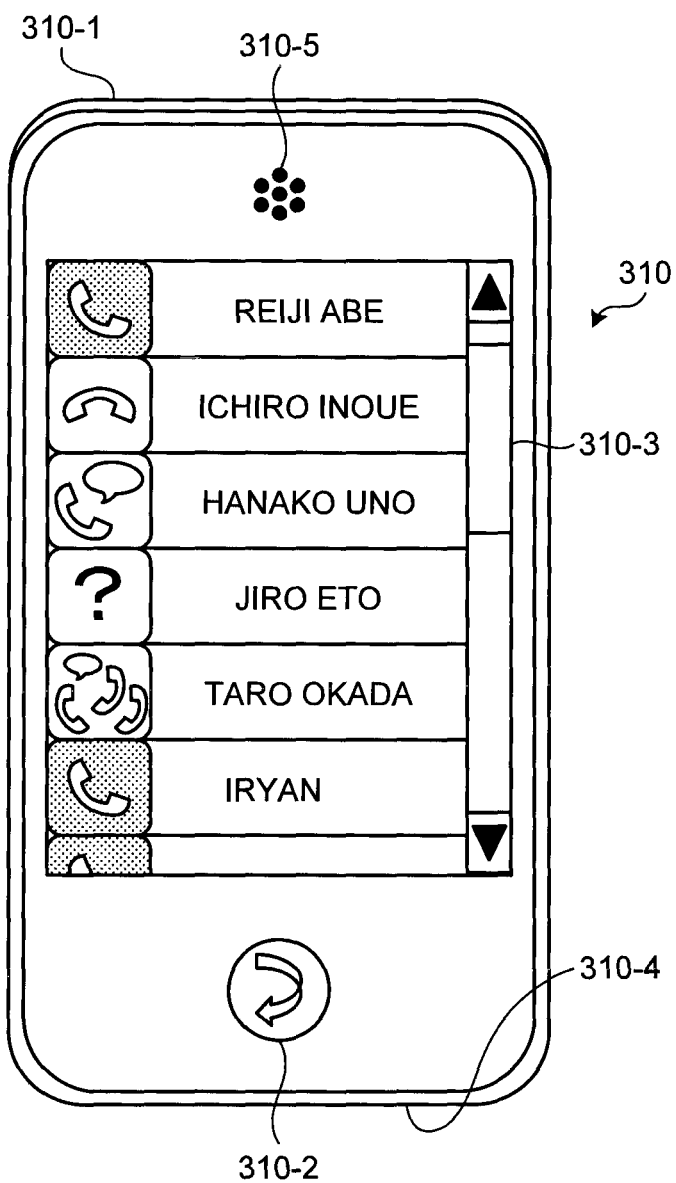
FIG. 27 is a conceptual diagram illustrating a destination list of another embodiment.

The communication system 1 may be a communication system of mobile phones. In this case, the terminal corresponds to a mobile phone, for example. A display example of a destination list for this case is illustrated in FIG. 27. FIG. 27 is a conceptual diagram illustrating a destination list of another embodiment. Specifically, a terminal 310 as a mobile phone includes a main body 310-1 of the mobile phone, a menu screen display button 310-2 arranged on the main body 310-1, a display unit 310-3 arranged on the main body 310-1, a microphone 310-4 arranged on the lower part of the main body 310-1, and a speaker 310-5 arranged on the main body 310-1. Among these, the "menu screen display button" 310-2 is a button for displaying a menu screen displaying icons indicating various applications. The display unit 310-3 is formed as a touch panel and can perform communication with another mobile phone through the selection of a destination name by a user.

Although the above embodiment describes a case of performing a teleconference by the communication system 1, it is not limiting and may be used in meetings, general conversations such as ones between members of a family or friends, or unidirectional information provision.

As described above, according to the present invention, the controller updates the state of connection between the communication terminal and the controller by the first updating unit, and updates the state of connection between the communication terminal and the other controller by the second updating unit based on the changed state information transmitted from the other controller. This enables the controller to manage the state of the communication terminal connected to the controller and the state of the communication terminal connected to the other controller, which produces the effect of controlling the session between the communication terminals based on the state information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

REFERENCE SIGNS LIST

1 Communication system
10 Communication terminal
11 Transmitter/receiver
12 Operation input accepting unit
13 Login requesting unit
14 Imaging unit
15a Voice input unit
15b Voice output unit
16 Display controller
19 Storage/reading processing unit
20 Destination list creating unit
30 Relaying apparatus
31 Transmitter/receiver
32 Relaying unit
39 Storage/reading processing unit
50 Controller
51 Transmitter/receiver (an example of a changed state information receiver, an example of a request accepting unit, an example of a transmitter, an example of an identification information transmitter)
52 Authenticating unit
53 State management unit
53a First changing unit (an example of a first updating unit)
53b Second changing unit (an example of a second updating unit)
54 Extracting unit
55 Detector
57 Session management unit
58 Identifying unit (an example of an identifying unit)
59 Storage/reading processing unit
60 Management apparatus
61 Transmitter/receiver
64 Extracting unit
69 Storage/reading processing unit
70 Router
80 Relaying apparatus selecting apparatus
81 Transmitter/receiver
82 Selecting unit
89 Storage/reading processing unit
90 Program providing system
100 Maintenance system
120 Display
500 Communication management system (an example of a control system)
1000 Storage unit
3000 Storage unit
5000 Nonvolatile storage unit
5003 Terminal management DB (an example of a state management unit)
5100 Volatile storage unit
6000 Storage unit
6001 Relaying apparatus management DB
6002 Terminal authentication management DB
6003 State management DB
6004 Destination list management DB
6005 Session management DB
6009 State change management DB
8001 Relaying apparatus selection management DB

CITATION LIST

Patent Literature

Patent Literature 1: Japanese Laid-open No. Patent Publication 2012-50063
Patent Literature 2: Japanese Laid-open Patent Publication No. 2008-71156

The invention claimed is:

1. A control system comprising a plurality of controllers that control a session between communication terminals,
each controller of the plurality of controllers comprising a memory and processing circuitry configured to
manage state information of each communication terminal, which indicates a state of connection between the communication terminal and the controller;
when the state of connection between a first communication terminal and the controller is changed, update state information of the first communication terminal, determine whether another controller is working in inter-node cooperation with the controller, and only when it is determined that the another controller is working in the inter-node cooperation, transmit information of the changed state of connection to the another controller;
when the state of connection between a second communication terminal and the another controller is changed and the another controller determines that the another controller and the controller are working in the inter-node cooperation, receive, from the another controller, changed state information of the second communication terminal, which indicates a state of connection between the second communication terminal and the another controller after being changed; and
update the state information of the second communication terminal based on the received changed state information, wherein
the controllers control the session between the communication terminals based on the state information of each communication terminal.

2. The control system according to claim 1, wherein
the processing circuitry of each controller of the plurality of controllers is further configured to accept, from the first communication terminal, a request for connection or disconnection with the controller, and update the state information of the first communication terminal based on the accepted request.

3. The control system according to claim 1, wherein
each controller of the plurality of controllers further comprises a detector that detects disconnection between the communication terminals and the controller, and
the processing circuitry of the controller is further configured to update the state information of the first communication terminal based on a result of the detection by the detector.

4. The control system according to claim 1, wherein each controller of the plurality of controllers further comprises a transmitter that, when the state of connection between the communication terminals and the controller is changed, is configured to transmit changed state information indicating a state of connection after being changed to the another controller only when it is determined that the another controller is working in the inter-node cooperation.

5. The control system according to claim 4, wherein
the processing circuitry of each controller of the plurality of controllers is configured to identify the another controller, and
the transmitter is configured to transmit the changed state information to the identified another controller.

6. The control system according to claim 5, wherein
each controller of the plurality of controllers comprises an identification information transmitter that transmits identification information identifying the another controller to all of the controllers within the control system, and
the processing circuitry of each controller is further configured to identify a controller as a connection destination based on a response to the identification information received from any of the controllers.

7. A communication system, comprising:
the control system as claimed in claim 1; and
the communication terminals.

8. A controlling method performed in a controller including processing circuitry that manages state information of each communication terminal, which indicates a state of connection between the communication terminal and the controller, the controlling method comprising:
updating, when the state of connection between a first communication terminal and the controller is changed, state information of the first communication terminal;
determining whether another controller is working in inter-node cooperation with the controller, and only when it is determined that the another controller is working in the inter-node cooperation, transmitting information of the changed state of connection to the another controller;
receiving, when the state of connection between a second communication terminal and the another controller is changed and the another controller determines that the another controller and the controller are working in the inter-node cooperation, changed state information of the second communication terminal, which indicates a state of connection between the second communication terminal and the another controller after being changed, from the another controller;
updating the state information of the second communication terminal based on the received changed state information received in the receiving step; and
controlling a session between the communication terminals based on the state information.

9. The controlling method according to claim 8, further comprising accepting, from the first communication terminal, a request for connection or disconnection with the controller, wherein
in the updating of the state information of the first communication terminal, the state information of the first communication terminal is updated based on the request accepted in the accepting step.

10. The controlling method according to claim 8, further comprising detecting disconnection between the communication terminals and the controller, wherein
in the updating of the state information of the first communication terminal, the state information of the first communication terminal is updated based on a result of the detection in the detecting step.

11. The controlling method according to claim 8, further comprising transmitting, when the state of connection between the communication terminals and the controller is changed, changed state information indicating a state of connection after being changed to the another controller only when it is determined that the another controller is working in the inter-node cooperation.

12. The controlling method according to claim 11, further comprising identifying the another controller, wherein
in the transmitting step, the changed state information is transmitted to the another controller identified in the identifying step.

13. The controlling method according to claim 12, further comprising transmitting identification information identifying the another controller to all of the controllers within the control system, wherein
in the identifying step, a controller as a connection destination is identified based on a response to the identification information received from any of the controllers.

14. A computer program product comprising a non-transitory computer-readable medium containing a computer program, wherein the computer program causes a computer that manages state information of each communication terminal, which indicates a state of connection between the communication terminal and the computer, to perform:
updating, when the state of connection between a first communication terminal and the computer is changed, state information of the first communication terminal managed by the computer;
determining whether another controller is working in inter-node cooperation with the controller, and only when it is determined that the another controller is working in the inter-node cooperation, transmitting information of the changed state of connection to the another controller;
receiving, when the state of connection between a second communication terminal and the another computer is changed and the another controller determines that the another controller and the controller are working in the inter-node cooperation, changed state information of the second communication terminal, which indicates a state of connection between the second communication terminal and the another computer after being changed, from the another computer;
updating the state information of the second communication terminal managed by the computer based on the received changed state information received in the receiving step; and controlling a session between the communication terminals based on the state information managed by the computer.

\* \* \* \* \*